US006972115B1

(12) United States Patent
Ballard

(10) Patent No.: US 6,972,115 B1
(45) Date of Patent: Dec. 6, 2005

(54) APPARATUS AND METHODS FOR THE PRODUCTION OF POWDERS

(75) Inventor: Stephen Gwyn Ballard, Hamden, CT (US)

(73) Assignee: American Inter-Metallics, Inc., West Warwick, RI (US)

( * ) Notice: Subject to any disclaimer, the term of this patent is extended or adjusted under 35 U.S.C. 154(b) by 405 days.

(21) Appl. No.: 10/070,078

(22) PCT Filed: Sep. 1, 2000

(86) PCT No.: PCT/US00/24143

§ 371 (c)(1),
(2), (4) Date: Mar. 1, 2002

(87) PCT Pub. No.: WO01/17671

PCT Pub. Date: Mar. 15, 2001

Related U.S. Application Data

(60) Provisional application No. 60/152,377, filed on Sep. 3, 1999.

(51) Int. Cl.[7] .............................................. B01J 19/08
(52) U.S. Cl. .............................. 422/186.04; 219/21.37
(58) Field of Search .................. 422/186.04; 204/164; 75/346, 10.21, 10.23; 219/121.37

(56) References Cited

U.S. PATENT DOCUMENTS

| | | | |
|---|---|---|---|
| 3,119,685 A | 1/1964 | Hansley et al. ................. 75/65 |
| 3,963,482 A * | 6/1976 | Kondis ......................... 419/63 |
| 4,268,325 A | 5/1981 | O'Handley et al. .......... 148/108 |
| 4,356,861 A | 11/1982 | Winter ........................ 164/462 |
| 4,503,013 A | 3/1985 | Lowther ...................... 422/127 |
| 4,610,718 A | 9/1986 | Araya et al. ................ 75/0.5 C |
| 4,796,687 A | 1/1989 | Lewis et al. ................. 164/455 |
| 5,062,936 A | 11/1991 | Beaty et al. ................. 204/164 |
| 5,091,253 A | 2/1992 | Smith et al. ................. 428/363 |
| 5,194,128 A | 3/1993 | Beaty et al. ................. 204/164 |
| 5,252,144 A | 10/1993 | Martis ........................ 148/121 |
| 5,294,242 A | 3/1994 | Zurecki et al. ............... 75/345 |
| 5,340,377 A | 8/1994 | Accary et al. ................ 75/334 |
| RE35,042 E | 9/1995 | Anderson, III et al. ..... 340/572 |

(Continued)

FOREIGN PATENT DOCUMENTS

EP          0347386          12/1989

(Continued)

OTHER PUBLICATIONS

Kotov, Y.A. and Samatov, O.M., *Production of Nanometer-Sized AlN Powders by the Exploding Wire Method.* 4th *Intern. Confer. on Nanostructured Materials.* Jun. 14-19, Stockholm, Sweden, no year available.

(Continued)

*Primary Examiner*—Kishor Mayekar
(74) *Attorney, Agent, or Firm*—Wiggin and Dana LLP; Gregory S. Rosenblatt; Anthony P. Gangemi

(57) ABSTRACT

Metallic powders are formed by the electrically exploded wire (EEW) process. An apparatus (20) for manufacturing such powders includes a closed loop recirculating gas path between a reaction chamber (100) and an extractor (32). A wire (31) is delivered from a source (400) along a wire path from ambient conditions outside the chamber to within the chamber. Within the chamber, a first electrode (200) has an aperture circumscribing the wire path and a second electrode (203) is located proximate to a terminal end of the wire path. A source (26) of electrical energy applies a discharge voltage between the electrodes to explode the length of wire therebetween to form an initial particulate. The initial particulate may be selectively extracted and processed to produce desired powders, in particular, energetic powders which are passivated for stability under ambient conditions.

33 Claims, 18 Drawing Sheets

U.S. PATENT DOCUMENTS

| | | | |
|---|---|---|---|
| 5,460,701 A | 10/1995 | Parker et al. | 204/164 |
| 5,486,675 A | 1/1996 | Taylor et al. | 217/121.59 |
| 5,514,349 A | 5/1996 | Parker et al. | 422/186.21 |
| 5,628,881 A | 5/1997 | Lemelson | 204/164 |
| 5,635,665 A | 6/1997 | Kishi et al. | 102/288 |
| 5,665,277 A | 9/1997 | Johnson et al. | 264/6 |
| 5,707,419 A | 1/1998 | Tsantrizos et al. | 75/336 |
| 5,788,738 A | 8/1998 | Pirzada et al. | 75/331 |
| 5,851,507 A | 12/1998 | Pirzada et al. | 423/659 |
| 5,874,684 A | 2/1999 | Parker et al. | 75/228 |
| 5,876,683 A | 3/1999 | Glumac et al. | 423/325 |
| 5,879,518 A | 3/1999 | Kuehnle | 204/164 |
| 5,885,321 A | 3/1999 | Higa et al. | 75/362 |
| 5,935,461 A | 8/1999 | Witherspoon et al. | 219/212.59 |
| 5,936,195 A | 8/1999 | Wheatley | 149/19.91 |
| 5,993,967 A | 11/1999 | Brotzman, Jr. et al. | 428/407 |
| 6,001,426 A | 12/1999 | Witherspoon et al. | 427/449 |
| 6,033,781 A | 3/2000 | Brotzman, Jr. et al. | 428/405 |
| 6,118,218 A | 9/2000 | Yializis et al. | 315/111.21 |
| 6,126,764 A | 10/2000 | Timmerman | 149/87 |

FOREIGN PATENT DOCUMENTS

| | | |
|---|---|---|
| EP | 0718061 A1 | 6/1996 |
| EP | 1031639 A1 | 3/2000 |
| GB | 1204261 | 9/1970 |
| RU | 1813812 A1 | 5/1993 |
| RU | 2013380 C1 | 5/1994 |
| RU | 2063417 C1 | 7/1996 |
| RU | 2064970 C1 | 8/1996 |
| RU | 2075371 C1 | 3/1997 |
| RU | 2093311 C1 | 10/1997 |
| RU | 2102337 C1 | 1/1998 |
| RU | 2105041 C1 | 2/1998 |
| RU | 2113318 | 6/1998 |
| RU | 2116164 | 7/1998 |
| RU | 2120353 C1 | 10/1998 |
| WO | WO 92 17303 | 10/1992 |
| WO | WO 00 10756 | 3/2000 |

OTHER PUBLICATIONS

Kotov Yu.A., Azarkevich E.I., Beketov I.V., Demina T.M., Murzakaev A.M., Samatov O.M., *Producing Al and Al₂O₃ Nanopowders by Electrical Expolsion of Wire. Key Engineering Materials.* Trans. Tech.Pub., V. 132-136, pp. 173-176, no date available.

Kotov Yu.A., Azarkevich E.I., Beketov I.V., Murzakaev A.M., *Synthesis of Nanometer-sized Powders of Alumina Containing Magnesia. Proceed of 9th Intern. Confer. on Modern Materials Technologies CIMTEC-98*, Jun. 14-19, 1998, Florence, Italy, Part B, pp. 277-284.

Beketov, L. V., et al., *Synthesis of Nanometer-Sized Powders of Alumina and Titania Using the Electrical Expolsion of Wire, Fourth Euro Ceramics*—vol. 1, pp. 77-82, 1995.

Kotov, Y.A.. Beketov, L. V. Murzakaev, A.M. Samatov, O.M., Bothme, R., Schumacher, G., *Synthesis of AlO, TiO, ZrO nanopowders by electrical explosion of wires,* Material Science Forum vols. 225-227, pp. 913-916 (1996).

Ivanov, V., et al., *Synthesis and Dynamic Compaction of Ceramic Nano Powders by Techniques Based on Electric Pulsed Power, Nanostuctured Materials*, vol. 6, pp. 278-290.

http: www.argonide.com.Advanced Nano Metal Powder Technology, 10 pps., downloaded Aug. 8, 2000.

Ivanov, G., et al. *Self-Propagating Process of Sintering of Ultradisperse Metal Powders, Vlkokl Akad.* Nauk SSSR, vol. 275, pp. 873-875, 1984.

\* cited by examiner

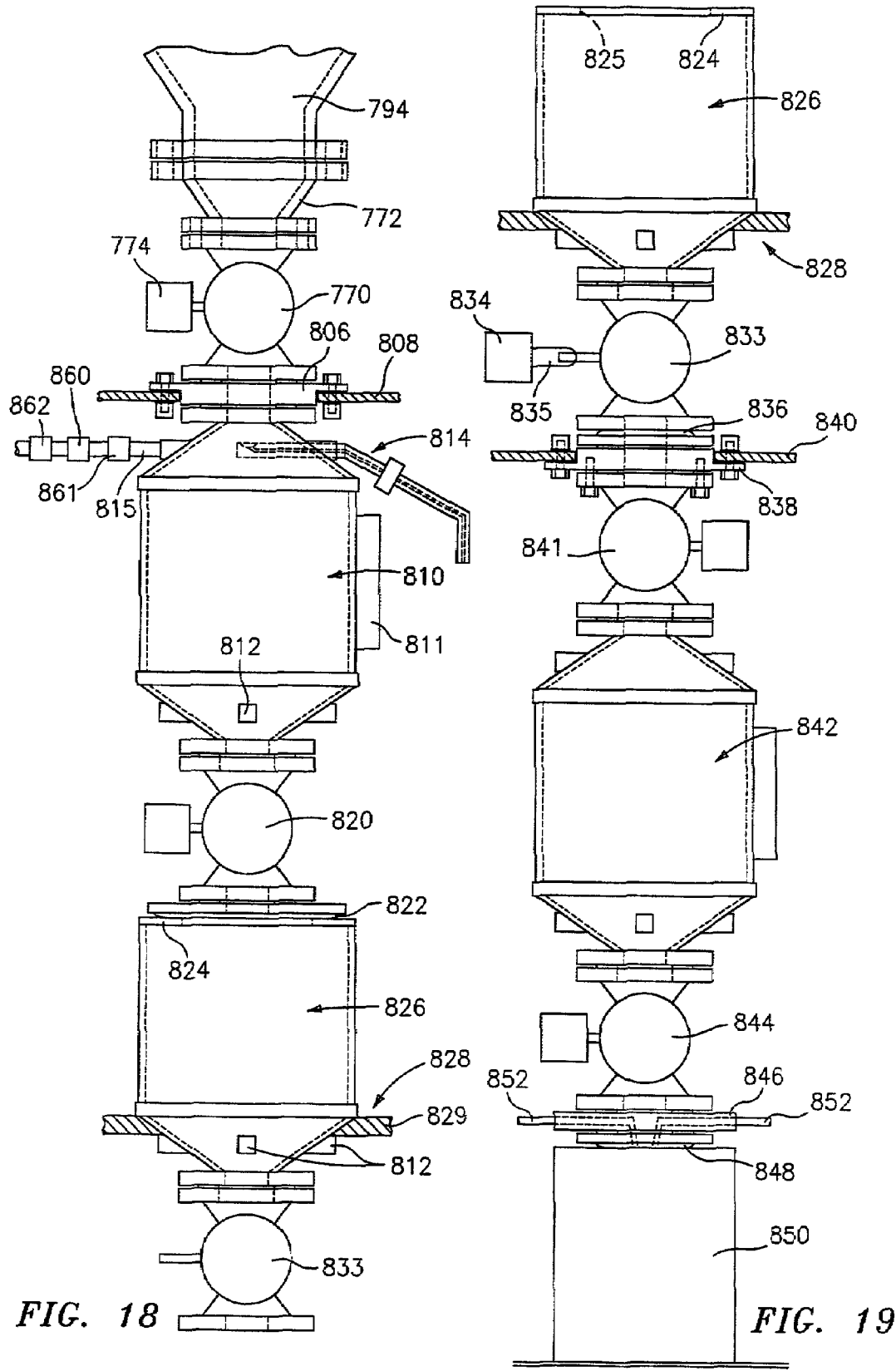

APPARATUS AND METHODS FOR THE PRODUCTION OF POWDERS

This is the U.S. national phase of PCT/US00/24143 entitled "APPARATUS AND METHODS FOR THE PRODUCTION OF POWDERS" that was filed on Sep. 1, 2000 and published in English on Mar. 15, 2001 and claims priority of U.S. Provisional Patent Application Ser. No. 60/152,377 entitled "APPARATUS AND METHODS FOR THE PRODUCTION OF POWDERS" that was filed Sep. 3, 1999, the disclosure of which is incorporated by reference in its entirety herein.

BACKGROUND OF THE INVENTION

This invention relates to the manufacture of powders. More particularly, it relates to explosive electrical discharge methods and apparatus for making ultra fine powders (UFPs), also known as nanopowders (commonly identifying mean particle sizes of less than 1 micron).

Powders of metals, and of derivative substances such as oxides and nitrides, have many uses, including manufacture of sintered components, surface coatings, composite materials, chemical catalysts, electrochemically active surfaces, pigments, and electrically-and thermally-conductive pastes and bonding agents.

Powders of certain metals, notably aluminum and magnesium, are additionally used as oxidants in solid rocket propellants, where powder particle size, degree of agglomeration, composition and state of surface, and perhaps also the particle crystal structure, greatly affect performance. Nanoparticle-metal fuels are known to burn many times faster than coarse-particle fuels; their more rapid thermal feedback from the flame to the material immediately behind it further increases burn rate and makes possible simpler nozzle designs. It is further significant that the specific energy content of very small metal particles exceeds that of coarse powders due to the mechanical strain of highly curved surfaces, and that nanopowders may additionally possess metastable structures such as a partially-disordered metal core and/or surface oxide layer. The energies associated with these structures may both lower kinetic barriers along the combustion coordinate and contribute to the overall enthalpy change, resulting in both faster-burning and more energetic propellants. Nanometal-based propellants are additionally less prone to incomplete burning and to the formation of slags, both of which are detrimental to the performance of solid rocket motors.

Sub-micron metal particles have high propensity toward partial self-sintering, resulting in an agglomerated product with reduced specific surface. Further, many metals are thermodynamically unstable with respect to their oxides and, in some cases, their nitrides. Such metals react spontaneously with air, liberating heat. For ultra-fine powders, the specific surface area is so large that exposure to air may result in run-away (combustive) oxidation or nitridation, i.e., the powder is pyrophoric. Metal powders may also react with moisture, for example to form hydroxides, or with atmospheric carbon dioxide to form carbonates. In the case of metal-based propellants, the metal particles are subject to slow oxidation by the oxidant itself (e.g., ammonium perchlorate).

To hinder such degradative processes, fine metal particles must be protected. Protective strategies include storage under inert liquids such as kerosene, chemical modification of the particle surface to form thereon a protective layer derived from the metal itself (intrinsic passivation), and coating the particle with an inert protective material (extrinsic passivation). By way of illustration, it is widely known that for some metals (an example being aluminum) an effective intrinsic passivation structure is a thin (typically 1–2 nanometers thick) coherent surface layer of oxide formed by slow reaction of the metal particle surface with molecular oxygen at low partial pressure. Surface nitridation may similarly be employed in some cases (an example is titanium). Passivation may in some cases be achieved by reacting the particle surface with a decomposable carbon-containing gas, resulting in the formation of a protective layer of graphitic carbon. Intrinsic passivation consumes at least a portion of the metal being protected. Extrinsic protection is more general, but often less conveniently applied. Examples are thin films of long-chain molecules such as stearic or oleic acid (see, e.g., Seamans et al., U.S. Pat. No. 6,093,309), or alternatively of derivative compounds thereof such as salts or esters, or films of polymers such as polyfluorochlorocarbons. When exposed to air, the coated particle suffers surface oxidation as dictated by its thermodynamics, but the process is slowed by the film. Thus, the powder can be exposed to air immediately after coating. A significant advantage of extrinsic passivation is that it does not consume the core metal. A limitation is that the coating may be deleterious to the end-use of the powder, and its removal may be difficult or prohibitively expensive. However, this method can be applied (by way of example) to powders employed in solid rocket propellants, where the polymer combusts along with the binder. Low-friction polymer coatings (such as poly-fluorochlorocarbons) may also assist formulation and loading of the propellant, by reducing its viscosity.

In addition to control of low-temperature self sintering and pyrophoricity, surface modification of ultrafine powders may have other benefits. By way of example, exposure of the surface of aluminum nanoparticles to controlled trace amounts of water vapor may result in the generation of hydrogen, which, in dissociated (atomic) form, dissolves in the metal core of the particle. Such particles may have superior combustion characteristics, enhancing their value as oxidants in rocket fuels.

The ability of electric currents to heat, melt, and vaporize conductors has been known for almost two hundred years. It is for example the basis of action of the common electrical fuse. Electrically heated wires are also used as pyrotechnic initiators in devices ranging from automobile air bags to fuel-air explosives.

Explosive electrical disintegration of metal wires (EEW) is believed to have been explored in secret in the former Soviet Union and its successor states, beginning in the late 1970s. Russian Patent 2075371 discloses such a method to produce small quantities of unpassivated powders of intermetallic compounds of two source metals. Russian Patent 2093311 discloses an exploding wire reactor coupled to a centrifugal powder extraction system by means of a recirculating gas path. Russian Patent 2120353 discloses the use of electrical detonation to produce fine powders, principally metal nitrides.

In the EEW method, an electrical voltage is applied between two points along a length of metal wire, such that the resulting current flow causes the wire to be heated, vaporized, and converted into a plasma in a brief interval of time, typically microseconds or less. The energy necessary to achieve EEW is most effectively delivered from a capacitor-bank storage system, and delivered to the load (wire) by means of a coaxial transmission line via a triggered spark-gap or other low-impedance, low-inductance high voltage switch.

The phase transitions from solid to liquid to vapor alter many of the properties of the metal. Significant is loss of tensile strength. Once the wire has melted, the forces of gravity and surface tension will break the metal filament (hence the current path) unless restrained from doing so. By way of example is the mechanical inertia of the metal itself, which preserves the integrity of the current path long enough for vaporization to occur. Neutral metal vapor is not electrically conductive, however. Thus, current flow (hence further heating) will cease when the metal vaporizes unless ionization is initiated, to form a plasma.

Primary ionization is largely thermal and photonic. It is followed by secondary ionizations that result in essentially complete ionization of the conduction path enabling the heating current to continue to flow. The resulting plasma may reach temperatures in excess of ten thousands degrees Kelvin but has an initial density substantially the same as the bulk solid metal, and hence possesses high internal dynamic pressure. Confinement of the plasma during the heating phase may be assisted by magnetostriction. Significantly, when the energy storage system has discharged any magnetostrictive force disappears. The dense, superheated plasma then explodes outwards into the surrounding medium, preferably a cold, high-pressure inert gas or even a liquid. The resulting adiabatic cooling of the metal vapor, assisted by heat transfer to the bath medium, causes the vapor to condense very rapidly into an aerosol of ultra-fine particles. The mechanism of disruption of the metal in the EEW process is thus fundamentally different from that of normal vaporization, which is the relatively slow (isothermal) boiling or sublimation of metal from the surface of the conductor.

The mechanism of subsequent solid-particle formation in EEW is also different from that in conventional gas-phase processes, notably in the speed with which it occurs. Rapid cooling of a material is commonly referred to as "quenching". It is known that quenching of many molten alloys produces non-equilibrium structures, i.e., strained lattices containing high concentrations of defects. Such materials are referred to as "metallic glasses". Normally, pure metals do not form quench glasses because their lattice relaxation rates are faster than commonly-achievable quench rates (typically $10^3$–$10^{7\circ}$ C./sec). However, quench rates in EEW are so high (up to $10^{9\circ}$ C./sec) that non-equilibrium lattices might indeed result even with pure metals. Such metal powders would be characterized by metastable "excess" energies, technically energies of re-crystallization or of other phase transitions, which would be released as heat in any subsequent relaxation of the powder, for example during heating or combustion. Thus, it is possible that EEW metal powders not only combust very much more quickly than coarser powders made by other methods, but that their combustion energy per unit mass is also greater. This may be significant to rocket propulsion.

The commercial development of ultra-fine metal powders and applications therefor is still in its infancy. There remains significant room for further development of such powders and for improvements in the methods and apparatus to efficiently manufacture such powders.

BRIEF SUMMARY OF THE INVENTION

In one aspect the invention is directed to an apparatus for the production of powder from a wire. The apparatus includes a substantially closed loop recirculating gas path having a first portion extending between a reaction chamber in which an initial particulate is generated by an EEW process and an extractor which extracts at least a portion of such particulate from the recirculating gas. A second portion of the path returns from the extractor to the reaction chamber. A wire source is located external to the reaction chamber and delivers the wire along a wire path extending into the chamber and having an upstream portion isolated from the recirculating gas in the reaction chamber. A first electrode has an aperture circumscribing the wire path within the reaction chamber. A second electrode is proximate a terminal end of the wire path within the reaction chamber. An electrical energy source is coupled to the first and second electrodes to selectively apply a discharge current between the first and second electrodes to explode a length of the wire to form said initial particulate.

In various implementations of the invention, a turbine may be located within the gas path upstream of the reaction chamber and downstream of the extractor. At least the first portion preferably includes cooled surfaces for removing heat from particles moving therealong. This may include a cooled helicoid surface. Preferably, less than 1% of the initial particulate returns to the reaction chamber along the recirculating gas path and most preferably less than 0.01%. To this end, the extractor may have a filter element having upstream and downstream surfaces. A portion of the particulate normally accumulates on the upstream surface until a sufficient amount of such portion has caked on the upstream surface to allow ejection of such caked particulate and cause such particulate to fall into a hopper. The filter element is preferably a porous sintered stainless steel element having a submicron pore size and is preferably formed including bundles of tubular elements.

Advantageously, the first electrode has a plurality of such apertures and may include at least a portion shiftable to sequentially bring each aperture into the operational position. This may be done via rotation about a first axis. The first electrode may include a body and a number of inserts mounted within the body, each defining an associated one of the apertures. Each insert may be formed of a tungsten-copper sinter and be mounted within the body from beneath. Each insert may include a central channel having a relatively wide upstream portion and a relatively narrow downstream portion defining the associated aperture. The first electrode may be vertically moveable to permit adjustment of an operative spacing between the electrodes. The first electrode may include a spider plate and the body may be mounted for rotation about the first axis relative to the spider plate. The second electrode may be supported by and electrically coupled to the energy source by a conductor extending through the chamber wall and within the chamber substantially surrounded by an insulator. A substantially nonconductive baffle may surround the insulator and have a slope which is directed generally downward toward the outlet effective to guide any stubs remaining after explosion out of the chamber. A stub trap may be provided between the chamber and the extractor.

Preferably, the wire source comprises a spool from which the wire is drawn endwise. The spool may be nonmoving during drawing of the wire. The wire may be stepwise advanceable along the wire path. The apparatus may include a wire straightening mechanism. The straightening mechanism may include a first engagement member receiving wire from the wire source and a second engagement member downstream of the first engagement member. During operation, the first and second members may be reciprocally moveable relative to each other to place an at least partially inelastic longitudinal strain on a length of the wire between the first and second engagement members. The strain may be between 1% and 10% of a yield strain. The first and second engagement members may comprise first and second clamps which are closeable to grasp the wire and openable to release the wire. In operation, one such clamp may be fixed along the wire path and the other such clamp may be moveable by an actuator between a first location in which the other clamp grasps the wire in a relatively unstrained condition and a second location in which the other clamp releases the wire at said at least partially inelastic longitudinal strain.

Preferably, a processing subsystem is coupled to the extractor. The processing subsystem includes a processing chamber containing a processing gas and a plurality of vessels within the processing chamber. Each vessel may have an upper port and a lower port and may be moveable through a plurality of positions. These may include: a loading position in which the vessel receives, through its upper port, powder separated by the extractor; a processing position in which the processing gas may come into contact with the powder in the vessel through the vessel upper port; and an unloading position in which the vessel discharges, through its lower port, processed powder. The powder in the vessel may be stirred in the processing position. The processing chamber may include a carousel rotatable through a plurality of orientations to move the vessels through the plurality of vessel positions. The vessel positions may further include a liquid agent delivery position through which the vessel receives, through its upper port, a liquid agent which coats and/or chemically reacts with the powder and a mixing position in which a mixing element is inserted through the vessel upper port to mix the liquid agent with the powder. The foregoing positions may be coincident or separate. A transfer vessel, optionally located within the processing chamber, may couple the extractor to the processing vessel in the loading position. The transfer vessel may include upper and lower ports sealed by upper and lower valves and may include an evacuation port.

Sampling devices may be provided to withdraw test samples of processed and/or unprocessed powder. Preferably, the wire may pass through a pressure balancing chamber prior to entry into the reaction chamber. The pressure balancing chamber may serve to conserve reaction gas and serve as an isolator. The isolator may comprise a first conduit receiving the wire from upstream and having an inner surface of a first minimum cross-sectional area. A second conduit may admit the wire to the chamber interior downstream and has an inner surface with a second minimum cross-sectional area. For wire relatively small compared with the first and second conduits, these cross-sectional areas may also approximate the annular cross-sectional areas between the wire and the conduits. A pressure balancing chamber may enclose respective downstream and upstream ends of the first and second conduits and may have a gas inlet port. A balancing gas source may be connected so as to introduce a balancing gas through the inlet port and maintain an internal pressure of the balancing chamber slightly below an internal pressure of the reaction chamber downstream of the balancing chamber along the wire path. The balancing gas may consist essentially of argon, nitrogen, or mixtures thereof. A valve may have an open condition in which the wire can pass between the first and second conduits and a closed condition in which the valve blocks the wire path at the gap and seals the second conduit. The wire may have a circular cross section with a diameter of 0.40 +/−0.02 mm at the source. The first cross-sectional area may be 1.5–4.1 mm$^2$ and the second cross-sectional area may be 7.3–17.0 mm$^2$. More broadly, the wire may advantageously have a cross-sectional area of about 0.1–0.4 mm$^2$ and the second cross-sectional area may be between 130% and 500% of the first cross-sectional area. At least one pressure sensor may be provided for determining a difference between the internal pressure of the balancing chamber and the internal pressure of the reaction chamber.

In another aspect, the invention is directed to a powder formed by electrically exploding an aluminum-containing wire to form an intermediate powder. The powder comprises in major part nonaggregated particles. A median characteristic particle diameter of the powder is between 0.05 and 0.5 $\mu$m. Each particle may include a nonconductive alumina layer about 1.5 nm to about 5 nm thick. The particles may be highly spherical as measured by an average ratio of major to minor diameter, which is most advantageously less than 1.1.

In another aspect, the invention is directed to a method for manufacturing an energetic powder comprising electrically exploding wire to form an intermediate powder, of which a major portion is nonagglomerated and has characteristic diameters between about 0.05 and 0.5 $\mu$m and passivating at least an amount of the desired portion of the intermediate powder, to render the passivated powder stable enough to be exposed to air at ambient temperature without spontaneous combustion.

The passivation may comprise exposing the powder to a passivating atmosphere containing argon and oxygen while periodically or continuously mixing such powder to maintain exposure to such atmosphere while maintaining a temperature of such powder at or below 20° C. The passivation may comprise coating the powder to be passivated with a coat that retards penetration of oxygen and exposing the coated powder to an atmosphere containing an oxygen concentration high enough so that the powder would initially combust absent the coat. The exposure is for a period of time effective to allow the atmosphere to form a passivating oxide layer on the powder. The coat may contain a long chain aliphatic carboxylic acid. The coat may be removed when the oxide layer has a thickness effective to prevent spontaneous combustion in air. The coat may comprise a chlorofluorocarbon polymer. The passivation may be performed while cooling the powder and the time may be 10–30 hours. The wire may be exploded in length of between 15 and 30 cm and a diameter of between 0.3 and 0.6 mm. The explosion may be performed in an atmosphere consisting essentially of argon or an argon/hydrogen mixture.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 18 is a partially schematic view of a processing vessel in a loading position in a processing subsystem of the system of FIG. 1.

FIG. 19 is a partially schematic view of a processing vessel in an unloading position in the processing subsystem.

Like reference numbers and designations in the various drawings indicate like elements.

DETAILED DESCRIPTION

Figure 1:
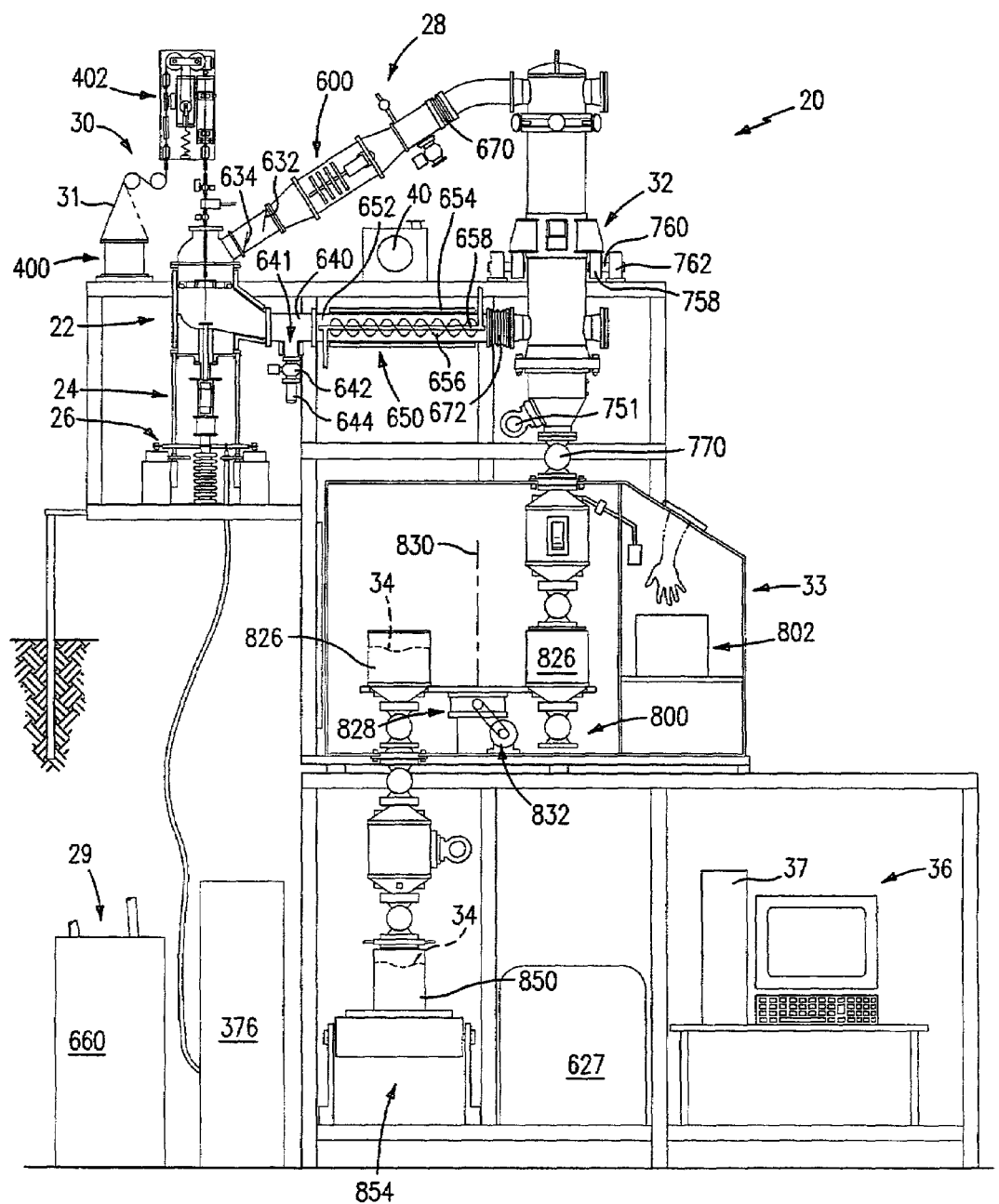
FIG. 1 is a partially schematic side overall view of a processing system according to principles of the invention.

The invention provides an enhanced method and apparatus for the production of ultra-fine metal powders, or equivalently of metal oxides, metal nitrides, metal carbides and other compounds that might result from reaction of a dense metal plasma with a surrounding (bath) gas. A high voltage, high-current, pulsed power source is provided effective to deliver a large amount of electrical energy to a metal wire. Preferably, the energy delivered will significantly exceed that necessary to evaporate the metal (e.g., by a factor of about 1.1 to about 3 in preferred embodiments), a condition referred to as "superheating". Energy is delivered over a period of time (e.g., a few microseconds in a preferred embodiment) short enough to ensure that the wire disintegrates explosively rather than simply evaporating.

By way of example, using 26AWG (0.404 mm diameter) aluminum wire feedstock (e.g., alloy 1188 (min. 99.88% pure) tempered to H-18 (dead soft)), exploded in 10 inch (25 cm) lengths, suitable discharge parameters include an approximately 0.1 Coulomb charge stored at a potential of 30 kV–50 kV on a low-inductance capacitor of approximately 3 microfarads and discharged through the wire in a time of approximately 2–5 microseconds. Ultra-rapid quench is achieved by surrounding the exploding wire with a cold, dense bath gas. An exemplary bath gas for the production of pure metal nanopowders has a composition by volume of 90% argon, 10% hydrogen and is at a temperature of 300 degrees K and a pressure of 2–5 atmospheres. Other gases are required if the end product is to be a metal compound or other chemical derivative. Such chemically reactive gases include, but are not restricted to, oxygen (for production of metal oxide powders), nitrogen (metal nitrides), acetylene (metal carbides), and boranes (metal borides). It is also noteworthy that two or more pure metals, or pre-existing alloys, can be co-exploded, thereby producing nanopowders of intermetallic compounds or alloys that may not be manufacturable by other means. Similarly, mixtures of gases may be employed in order to provide mixtures of corresponding metal compounds such as nitrides, carbides, oxides and the like.

In all cases, the EEW discharge results in a dense metal plasma which persists for a few microseconds. An exemplary temperature is thought to be between 10,000 and 30,000° C. at this point. Magnetically confined plasmas of high density are known to be dynamically unstable; such instabilities are referred to as "Z-pinches" or "zeta-pinches". High-speed photographs of exploding wires show the characteristic "zig-zag" discharge arcs of zeta-pinches.

As the electric current decays (due to discharge of the capacitors), the internal pressure of the plasma drives it into the surrounding bath gas at hypersonic speed. Because of the plasma instability noted above, this expansion will generally not be uniform or even radially symmetrical, which may account at least in part for the distribution of resulting particle sizes (see below). Thermal evolution of the system is now controlled by the competing kinetics of two processes: heat evolution from ion-electron recombination and/or chemical reaction of the metal plasma with the bath gas, and heat loss by combined radiation, adiabatic expansion and momentum transfer to the bath gas. As ion-electron recombination and other chemical processes become substantially complete, the temperature of the system falls extremely rapidly, causing condensation of the metal vapor into solid particles. The condensation may pass through a very brief transient liquid phase, accounting for the high particle sphericity normally observed due to surface tension in the liquid.

As mentioned above, rapid formation of a solid phase from a liquid or gaseous phase (a process referred to as "quenching") often results in non-equilibrium structures. For example, molten metals sprayed onto cryo-cooled surfaces may solidify to produce disordered lattices referred to as "metallic glasses", that have markedly different mechanical, U thermal, and electrical properties from the crystalline metals. In the present process, quench rates are several orders of magnitude greater than are encountered even in cryo-cooling. Whereas in conventional cryo-cooling processes for manufacturing metal-alloy glasses the cooling rate is typically on the order of $10^{6°}$ C./s, in the EEW production of powders advantageous cooling rate during the particle condensation phase is in the vicinity of $10^8$–$10^{9°}$ C./s. Further, the physical and chemical conditions present in the plasma are extremely severe. Hence it is not surprising that the observed properties of the resulting EEW-powders are quite different than those of conventional metal powders.

Certain of the metal nanopowders made in an argon atmosphere contain a significant "excess" internal energy which is almost indefinitely stable at normal temperatures but which can be released by raising the powder to an elevated temperature, normally well below the melting point of the bulk metal. When released, this metastable energy may be sufficient to cause the powder to melt almost instantaneously, a process referred to as "temperature explosion". The self-heating property of the metal nanopowders, together with their small size and spherical particle shape, gives such powders high commercial value. For example, when such powders are formulated into rocket propellants, the released excess energy adds to the heat of combustion of the metal, resulting in burn rates, nozzle pressures, and thrust levels that may be unattainable by other chemical processes. The mechanisms of storage and release of the excess energy may not be understood in detail at this time.

Certain information exists concerning the sizes of metal and metal oxide particles made by EEW. These invariably have a rather wide distribution, that may have a minor secondary peak (i.e., bimodal). Quantitative understanding of the distribution is not yet available. However, it is clear that it is dictated principally by the density of the plasma and its dynamics of expansion. Thus, thick wires (meaning 0.5 mm diameter or thereabouts) exploded with small superheats (ratio of electrical energy used to explode the wire to the energy of vaporization of the wire (measured from the starting conditions)) (e.g., 1.2 or less) generate coarse powders (i.e., in the micron range), whereas thin wires (a few tenths of a mm) exploded with large superheats (meaning approximately 1.8 or greater) produce fine powders (e.g., 0.1 micron diameter or less). High bath gas pressures result in larger particles than lower pressures, by hindering the expansion of the plasma. The reason for bimodality in some cases is not well understood.

Nano-particulate aluminum made by the preferred EEW method is extremely pyrophoric, and must be passivated for safe use. Several methods have been used in the case of aluminum to achieve such passivation. The first method is controlled oxidation of the nanoparticle surface under conditions that produce a dense, coherent crystalline surface oxide layer. The preferred atmosphere for this method is argon containing 10–1000 ppm oxygen, to which the dry metal nanopowder is exposed at atmospheric pressure for a period of 1–2 days, during which the powder is kept in a cooled container to maintain a temperature at or below 20° C. During the passivation process, the powder is slowly stirred to expose it to the passivation atmosphere. The resulting powder comprises aluminum nanoparticles each having an alpha alumina (a.k.a. corundum, sapphire) surface layer shown by electron micrography to be approximately 1.5–5 nm thick (see, for example, Y. Champion and J. Bigot, NanoStructured materials Vol. 10, pp. 1097–1110, 1998 (metal vapor condensation within a cryogenic medium (liquid Ar))). This layer effectively prevents further oxidation of the particle by air, and also renders it resistant to erosion by atmospheric moisture. A lesser oxide thickness may result in residual pyrophoric behavior in a oxygen-rich atmosphere. Greater thicknesses imply unnecessary depletion of the energy-rich metal core of the particle. Passivation may not be required at all for nonreactive metals (e.g., gold).

In a second passivation process, dry unpassivated metal nanopowder is coated with a layer of long-chain aliphatic carboxylic acid, of the form $C_nH_{2n+1}COOH$ where n is preferably from 10 to 19 (undecylic acid (melting point 30° C.) to arachidic acid (melting point 77° C.)), for example stearic acid $C_{17}H_{35}COOH$ (melting point 60° C.). Melting point and hardness increase and oxygen permeability decreases with molecular weight. The layer is applied by wetting the powder with a solution of the acid in an appropriate solvent, which is then evaporated. Solid esters of long-chain organic acids with mono- and poly-hydroxy alcohols are also useful. Other organic coatings may be utilized.

In a third passivation process, dry unpassivated metal nanopowder is coated with a layer of an organic polymer. The preferred coating is a low molecular-weight chlorofluorocarbon polymer having a chain of the form $(C_2F_3Cl)_n$ with exemplary opposing end groups of H and OH or Cl and $CCl_3$. An exemplary such polychlorotrifluoroethylene is sold by Minnesota Mining and Manufacturing of Minneapolis, Minn. under the trademark KEL-F. This is a hard semi-crystalline polymer with a substantially lower permeability to gases, and thus is more effective at retarding oxygen penetration than the more common halocarbon polymer such as polytetrafluoroethylene and the fluoroelastomer sold by DuPont Dow Elastomers L.L.C. of Wilmington, Del. under the trademark VITON. The polymer may be formed in situ from appropriate precursors applied in liquid form to the nanopowder.

The purpose of either the stearic acid or the polymer coat is to retard penetration of atmospheric oxygen to the particle surface, such that a slow, controlled surface oxidation occurs. The advantage of this method of passivation is that the powder does not have to be kept in a controlled atmosphere for a long period of time, as the passivating oxide layer forms. The stearic acid may subsequently be removed if required by washing with an appropriate non-aqueous solvent. The polymer material would not normally be removed, however, because of its insolubility. Hence the polymer coat method is best suited to applications where the presence of chlorofluorocarbon polymer is not detrimental (or may even be advantageous), for example in some solid rocket propellant formulations.

It is advantageous for the rapid optimization of the EEW conditions to be able to rapidly measure the thermodynamic properties of small samples of the unpassivated powder product in situ. If such information is only obtainable by analysis of passivated powder after batch processing based on a 1–2 days' incubation cycle, adjusting the reactor conditions is extremely slow and tedious, whereas the ability to sample and analyze a few grams of powder before passivation and without removing it from the machine permits the conditions of pressure, gas composition, electrical energy, etc., to be adjusted very much more quickly.

To this end, the processing/passivation chamber is equipped with a scanning differential calorimeter appropriate for measuring heat evolution from the powder. The intermediate transfer vessel is equipped with a sampling device for diverting small aliquots of powder from the production stream into it. In the simplest embodiment, charging and discharging the calorimeter may be done manually, for which purpose the processing chamber is equipped as a glove box. In a more advanced embodiment, powder may be transferred to the calorimeter and removed from it after the measurement by means of a robotic mechanism or other automated device.

FIG. 1 shows an embodiment of the invention as a self-contained, automated system 20 for manufacturing, extracting, processing, and bottling nanoparticulate metal powders and derivative solids such as oxides, nitrides, carbides, borides, hydrides, alloys, mixed crystals, intermetallics, and the like. The exemplary system is formed as a single substantially closed loop (i.e., allowing minor losses, diversions, and the like). The exemplary system 20 generally includes the following subsystems:

an EEW reactor subsystem 22;
an EEW discharge subsystem 24;
a high-voltage (HV) electrical subsystem 26;
a reactor gas handling subsystem 28;
a cooling system 29;
a wire feed subsystem 30 for feeding a wire 31 into the reactor;

a product extraction subsystem 32 and a processing subsystem 33 for extracting and processing the powder 34; and a control and monitoring subsystem 36 including a computer 37 for controlling and monitoring and logging the other subsystems.

Figure 2:
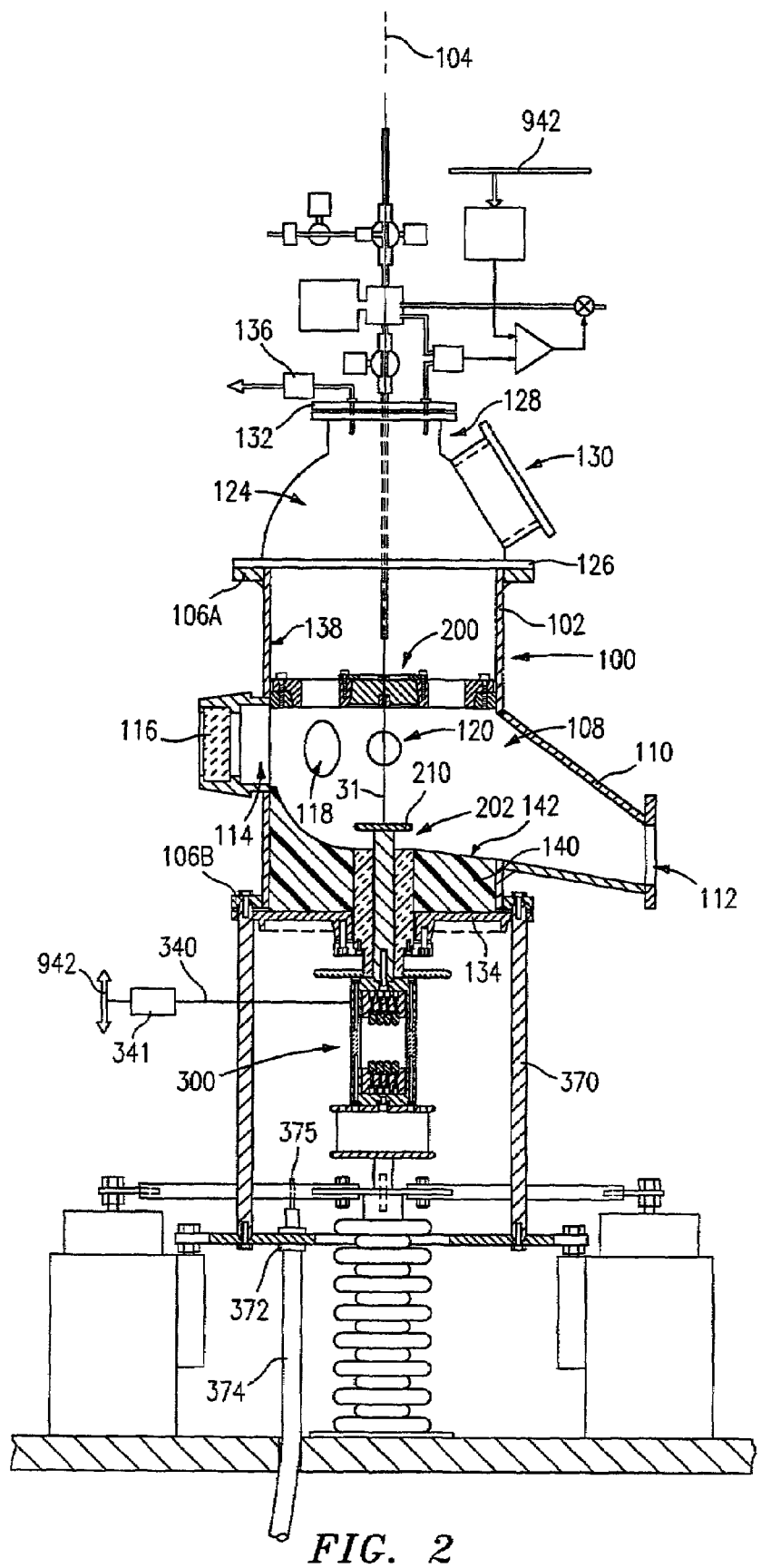
FIG. 2 is a partially schematic side sectional view of reactor and electrical subsystems of the system of FIG. 1.
Figure 3:
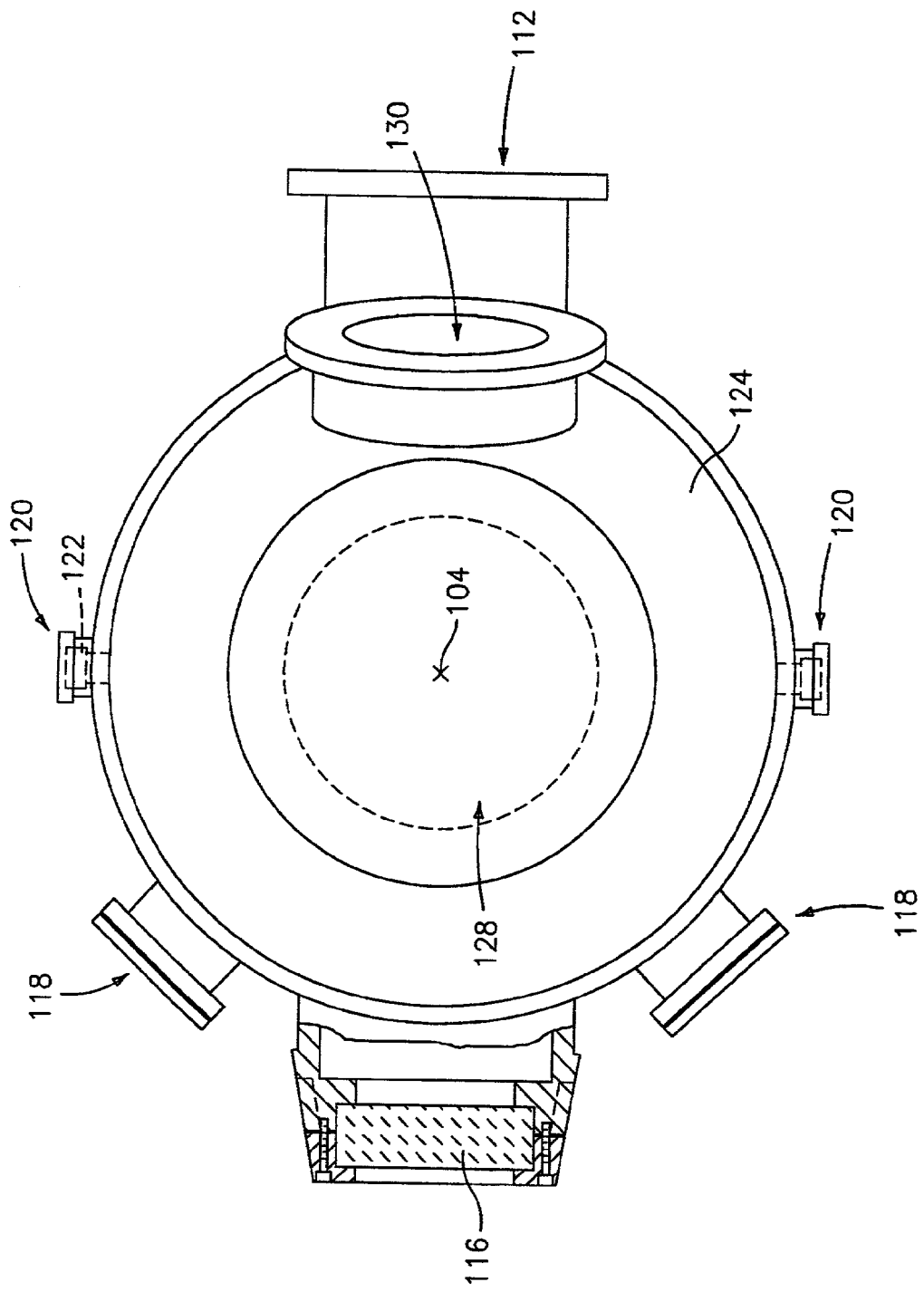
FIG. 3 is a partially schematic top view of the reactor of FIG. 2.

The heart of the EEW reactor 22 is a metal vessel 100 which defines a reaction chamber (FIG. 2) made from metal appropriate for the enclosed gas (in most cases, the preferred metal is T-304 or T-316 stainless steel), with sufficient wall thickness to safely withstand the sum of the internal static pressure P (e.g., up to about 150 psia (1 MPa)) and the superimposed EEW pulse overpressure ΔP (e.g., up to about 200 psia (1.4 MPa) for 100 μs). The vessel includes a cylindrical midsection 102 having a central longitudinal axis 104 and fitted with end flanges 106A, 106B. The body includes an outflow (outlet) port 108 about which is welded an outlet duct 110 having, at its downstream end, a flanged outlet port 112 defining a reactor outlet. The midsection includes an observation port 114 carrying a viewing assembly including a sight glass or window 116. The exemplary window is a 5 inch (13 cm) diameter by 1.75 inch (4.4 cm) triple borosilicate-epoxy laminate glass. The midsection also includes a pair of flanged instrumentation ports 118 and a pair of flanged spectroscopy ports 120 (best seen in FIG. 3). FIG. 3 also shows the preferred port orientation wherein the sight glass 116 is diametrically opposite the reactor outlet 112, with the orthogonal instrumentation ports at 45 degrees to either side of the observation port about the axis 104. The spectroscopy ports 120 are diametrically opposed about the axis 104 each 90 degrees away from the observation port and 45 degrees away from an adjacent one of the instrumentation ports. The spectroscopy ports advantageously include a fused silica window 122 having at least about a 0.5 inch (1.3 cm) diameter view to permit spectroscopy readings to be taken through the reactor. The cover plates of the ports 118 carry sensors for measurement of the EEW discharge parameters. The sensors may include a fast photodiode light detector, a soft x-ray detector, and a transient overpressure transducer.

A generally hemispherical upper section 124 of the vessel (FIG. 2) is fitted with a mouth flange 126 bolted to the midsection upper flange 106A, and has a flanged central top port 128 and a flanged lateral gas inflow (inlet) port 130. The vessel also includes a circular upper end (top) plate 132 mated to the top port flange and a circular lower end (bottom) plate 134 mated to the lower flange 106B. All flanges and plates are preferably fitted with bolt circles and seals (for example, O-rings or gasket rings of soft metal, e.g., annealed copper) according to standard engineering practice, enabling the vessel to safely contain both the negative (−1Atm gauge, vacuum) and the positive (P+ΔP) differential pressures potentially encountered during reactor operation. Pressure within the reactor may be measured via a sensor 136 coupled to the control system data bus.

The vessel also contains an upper electrode assembly 200 and a portion of a lower electrode assembly 202 of the discharge system 24. The upper and lower electrodes, along with the length of wire 31 therebetween, provide the internal EEW discharge path. The upper assembly 200 is mounted to the interior surface 138 of the vessel midsection whereas the lower assembly extends through the bottom plate 134 and within a contoured baffle 140, the upper surface 142 of which defines a general downward slope toward the outlet 108.

Figure 4:
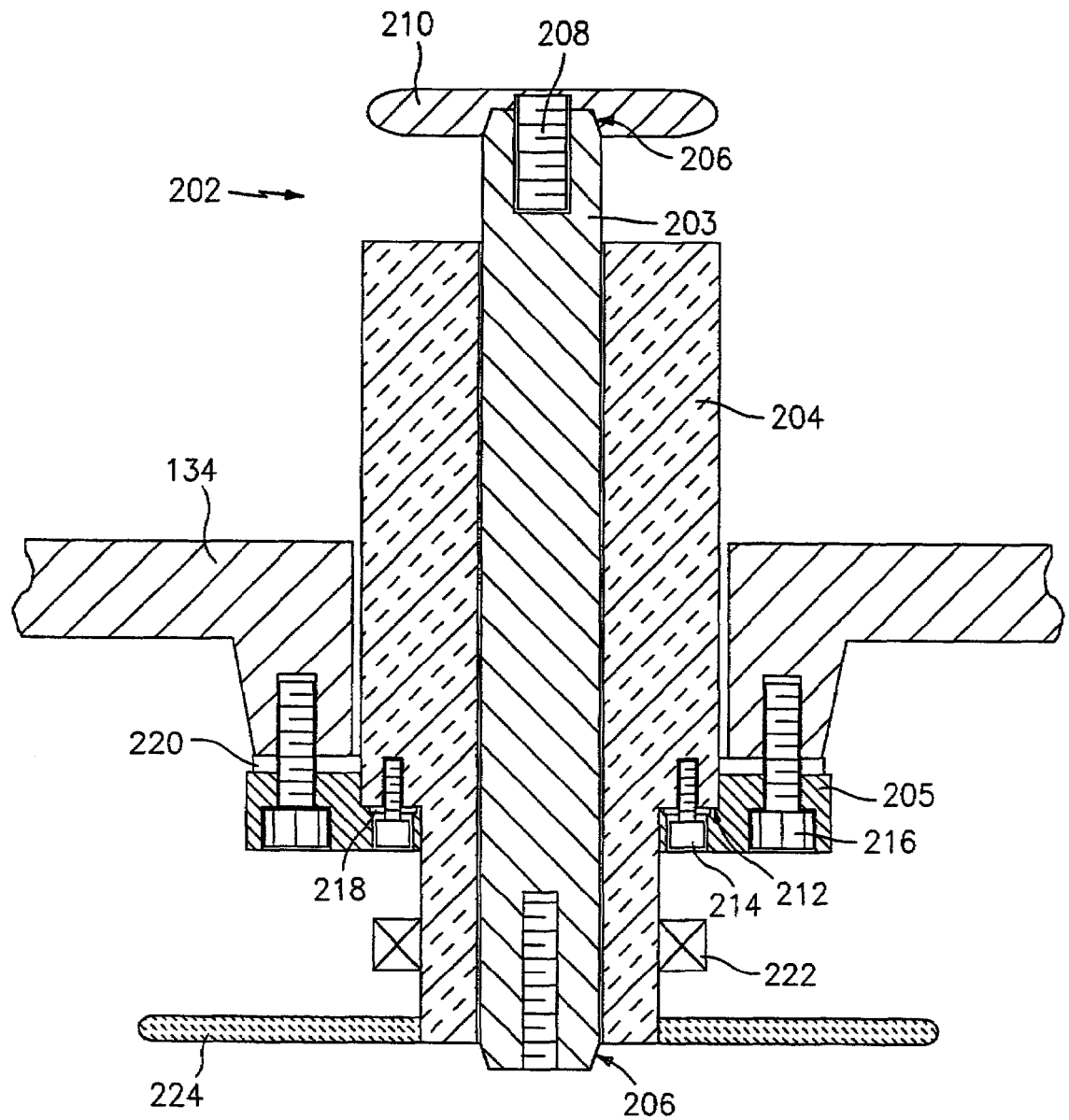
FIG. 4 is a vertical sectional view of a high voltage electrode assembly of the system of FIG. 1.

The high voltage electrode assembly 202 (FIG. 4) comprises a central bus-bar 203, preferably 10–12 inches (25–30 cm) in length, 2 inches (5 cm) in diameter, and made of electrolytic-grade copper, an insulator 204 surrounding the bus-bar, and a mounting flange 205. The assembly is intended to extend through and seal with the reactor vessel bottom plate 134, but be easily removable for servicing.

The ends of the bus-bar are machined to form tapers 206, and are centrally drilled and fitted with thread inserts, preferably 0.5 inch (1.3 cm) in diameter and threaded 32 tpi (12.6 tpcm). A threaded stud 208, preferably 0.5 inch (1.3 cm) in diameter and threaded 32 tpi (12.6 tpcm), is screwed tightly into the upper insert, such that a short portion of the stud protrudes from the end of the bus-bar, the protruding portion being preferably about 0.375 inch (1 cm) in length. A replaceable metal electrode disk 210, preferably of the same metal as the wire to be exploded, has a smooth polished flat central upper surface portion and a lower surface having a compartment of complementary taper to the upper end of the bus-bar and having an aperture with a thread insert for receiving the protruding portion of the stud 208. The threaded engagement between the bus-bar and the disk via the stud 208 provides high engagement forces between the complementary tapers so as to produce electrical contact between the two of low resistance and high current-carrying ability. Exemplary disk dimensions are 4 inches (10 cm) in diameter and 0.75 inch (1.9 cm) thick with a rounded perimeter edge joining the upper and lower surfaces.

The insulator 204 is formed of heat resistant and mechanically rigid material with high dielectric strength. A preferred material is a glass-epoxy composite such as G-10 (a glass-filled epoxy certified by the National Electrical Manufacturers Association (NEMA) for applications requiring high tensile strength, high dielectric strength and stability at elevated temperatures.) or the like. The insulator preferably has a 5 inch (13 cm) overall diameter and has an overall length approximately 2 inches (5 cm) less than the bus-bar. A central axial bore of diameter preferably slightly (e.g., 1/16 inch (0.16 cm)) greater than the diameter of the bus-bar runs the length of the insulator. The bus-bar is sealed into the insulator such as by a medium viscosity semi-pliable silicone or epoxy compound, forced under pressure into the annular space between the bus-bar and the central bore of the insulator, then cured in situ.

A lower portion of the insulator is of reduced diameter and is separated from the upper portion by an annular shoulder 212. The shoulder is preferably approximately 0.75 inch (1.9 cm) in radial span and includes an array of holes fitted with thread inserts. The shoulder 212 is received in an upwardly-open central compartment of the flange 205 and is secured thereto via an array of bolts 214 engaging the shoulder's array of holes. The flange 205 is preferably formed of stainless steel 8 inches (20 cm) in diameter and one inch (2.5 cm) thick overall.

In addition to an inboard array of counterbored holes for the bolts 214, an outboard array of counterbored holes is provided for bolts 216 securing the flange 205 to the reactor bottom plate 134. The bolts 216 preferably extend into a depending central boss of the bottom plate 134 surrounding an aperture which accommodates the insulator. The flange is preferably sealed to the insulator by an elastomeric gasket 218 and to the reactor bottom plate by a soft copper gasket 220.

The lower portion of the insulator carries a fast current-pulse transformer 222 for monitoring the EEW current waveform. This is coupled to a transient digitizer (not shown), thence to the bus of the control and monitoring subsystem. A relatively large diameter insulating disk 224 (e.g., glass, ceramic, or G-10) is secured to the insulator 204 at its lower end to prevent arc-over from the spark gap (described below) to the transformer 222 and/or the bottom plate 134 and components secured thereto.

Figure 5:
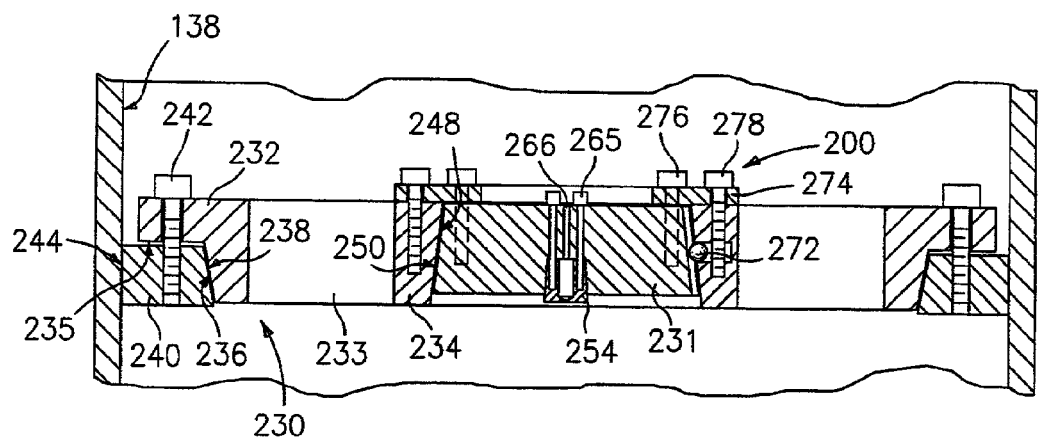
FIG. 5 is a vertical sectional view of a grounding electrode assembly of the system of FIG. 1.
Figure 7:
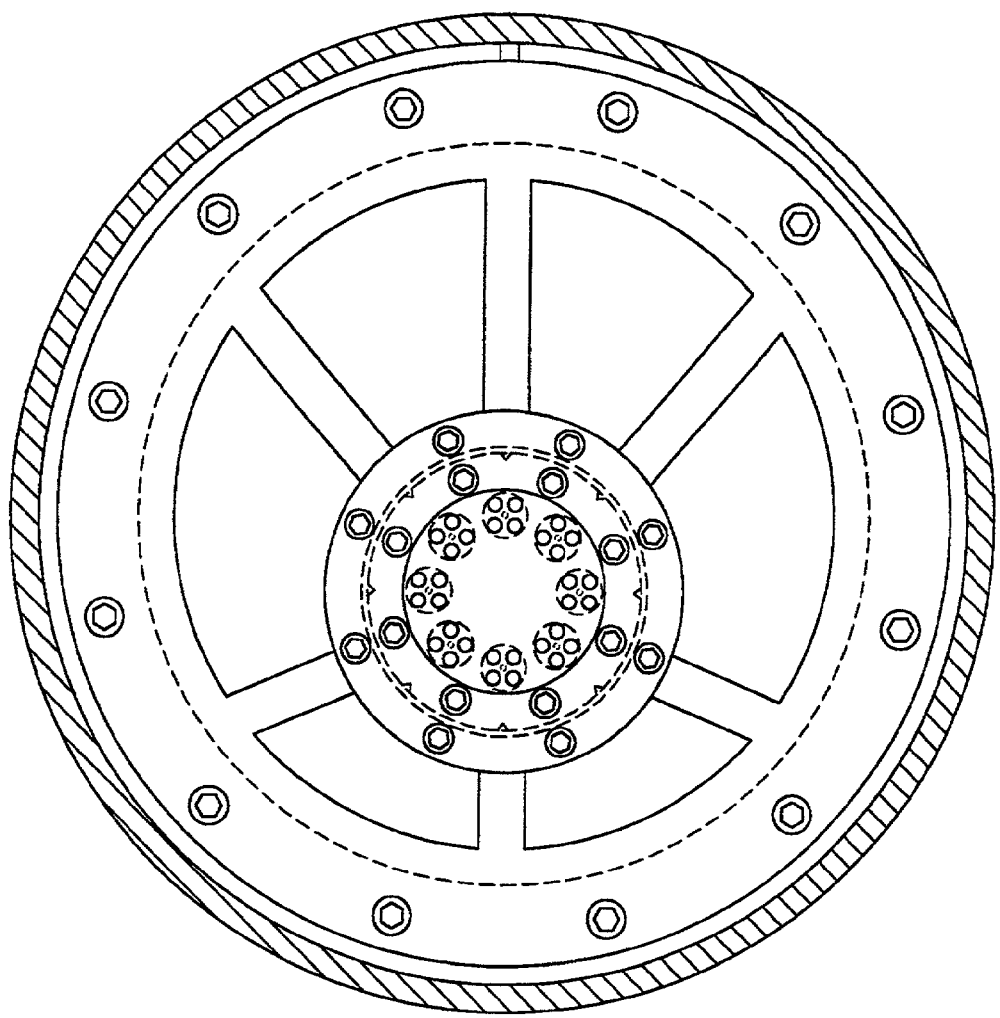
FIG. 7 is a top view of the assembly of FIG. 5.

The grounding electrode assembly 200 (FIG. 5) carries the EEW discharge current from the upper end of the exploded segment of wire to the vessel midsection wall of the reaction chamber, thence to ground. It further provides a gas flow path from the upper domed section of the reactor chamber (where the recirculating gas enters the reactor) to the central cylindrical section of the chamber (where the gas entrains the plume of metal particles created by the wire explosion and then exits the reactor).

The assembly 200 (FIG. 5) includes a metal spider 230 and an electrode insert carrier having a body 231 carried by the spider. The spider comprises a circular rim 232 connected by a plurality of spokes 233 to an eccentric hub or boss 234, the rim being machined to an outside diameter a few thousandths of an inch (hundredths of a mm) less the inside diameter of the central section of the reactor vessel into which the spider is push-fit (the diametric difference between chamber and spider being exaggerated in the drawing). The spider is preferably of cast aluminum, two inches (5 cm) thick and 17 inches (43 cm) in diameter. The boss is preferably eight inches (20 cm) across. The spokes are preferably six in number, with widths approximately one inch (2.5 cm), providing a low-resistance path from the boss to the rim. The spaces between the spokes are effective to allow free passage of gas from the upper portion of the reactor chamber to the lower.

The rim of the spider is machined to form a shoulder 235 which defines an upper flange at the maximum rim diameter. The maximum rim diameter extends to the upper surface of the spider. Below the shoulder a downwardly tapering neck extends to the lower surface (underside) of the spider. The tapering surface 236 of the neck is complementary to and nested within an inner surface 238 of a ring 240. An upper surface of the ring faces the shoulder 235 and is slightly spaced-apart therefrom. The flange portion and ring have aligned circular arrays of holes, the latter bearing threaded inserts which receive bolts 242 securing the flange to the ring. The ring is provided with a circumferential gap 243 allowing the ring to be expanded and contracted via interengagement of the tapering surface of the rim and ring when the bolts 242 are tightened and loosened. With the assembly 200 in a desired position, tightening of the bolts 242 thus produces a radial expansion of the ring 240 by opening the gap 243 to cause the perimeter surface 244 of the ring to bear against the interior surface 138 to secure the assembly in a desired vertical location with robust electrical contact between the assembly and the reactor vessel.

Figure 6:
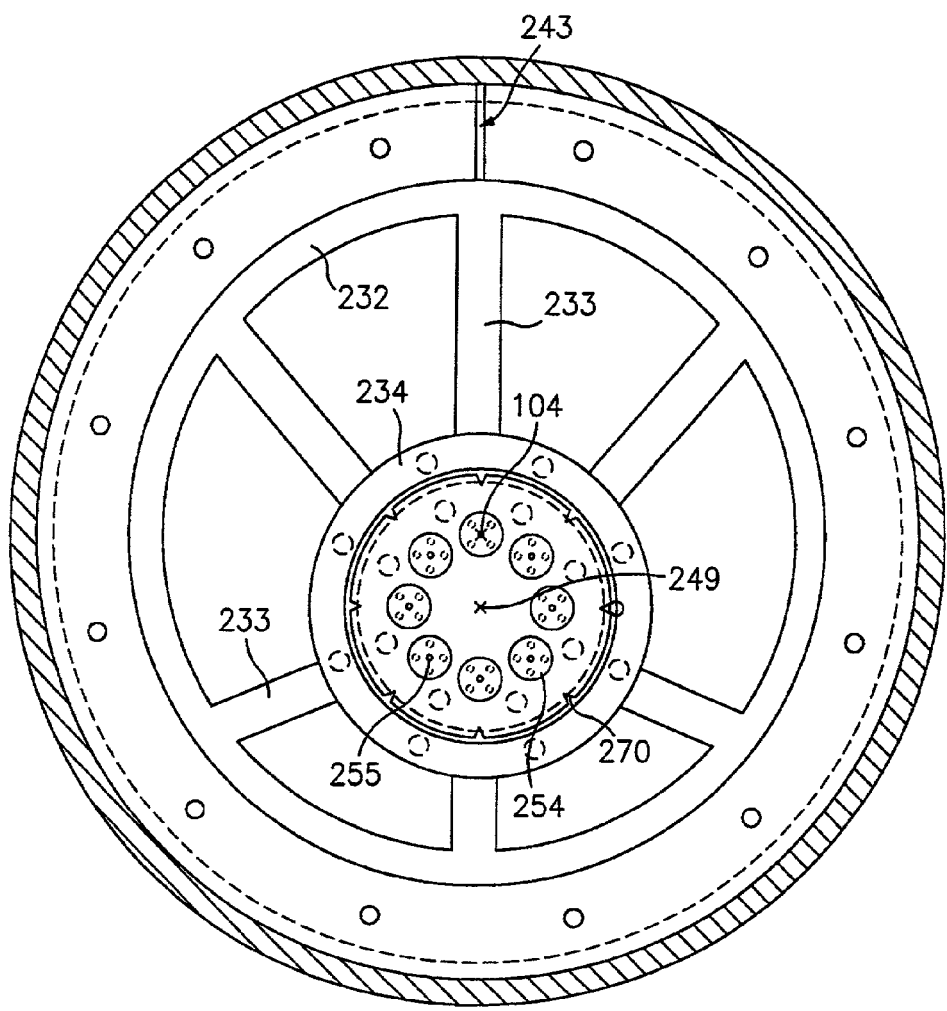
FIG. 6 is a bottom view of the assembly of FIG. 5.

The boss 234 of the spider is through-machined with an upwardly-tapering central hole defined by a surface 248, around the periphery of which is a circle of bolt holes with thread inserts. The surface 248 is coaxial with a central axis 249 of the boss 234 and body 231 and offset from the reactor axis 104 (FIG. 6). The body 231 has upper and lower surfaces joined by an upwardly-tapering surface 250 of complementary taper to the surface 248.

Figure 8:
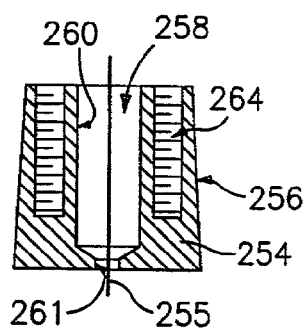
FIG. 8 is a vertical sectional view of an electrode insert of the assembly of FIG. 5.

The body 231 preferably carries a plurality of individual inserts 254. Each insert has a central axis 255 offset from the axis 249 by the same distance that the latter is offset from the axis 104. Each insert 254 is received by mating features of the carrier body 231 (e.g., a circular compartment extending upward from the bottom surface thereof). Inserts 254 are formed of refractory metal such as a 70% tungsten-30% copper sinter or may be machined from the same metal as the wire to be exploded in the reactor. The insert has flat upper and lower surfaces and an upwardly-tapering perimeter surface 256 (FIG. 8) complementary to a taper of the circular compartment of the carrier body 231. A central channel 258 extends 1 through the insert and has a relatively large diameter upper portion 260 and a relatively small diameter lower portion 261. The central channel 258 functions to accommodate the wire. The advantageous knife edge-like lower portion 261 serves to provide a large electrical field gradient to localize breakdown during initiation of wire explosion. This provides for a consistent length of wire being exploded. Each insert 254 includes an array of threaded mounting holes 264 which receive machine screws 265 extending through co-aligned holes in the body 231. The body includes a channel 266 (FIG. 5) aligned with the central channel 258 of each insert.

When a given insert has become eroded from extended use, the body 231 may be rotated about its axis to bring a fresh insert into the operative position aligned with the axis 104. To provide for accurate registry of the intended insert with the axis 104, for each such insert there is provided in the carrier body an associated detent recess 270 (FIG. 6). A spring-loaded ball 272 (FIG. 5) in a compartment within the boss can engage a detent recess to bias the carrier into the exact operative orientation for the associated insert. To secure the carrier body within the boss, an annular plate 274 may be provided having inboard and outboard circles of holes, receiving bolts 276 and 278 which respectively extend into threaded engagement with corresponding bolt holes in the carrier body upper surface and hub upper surface. To reposition the carrier, the inboard set of bolts is loosened slightly to bring the tapering surfaces 250 and 248 out of compressive engagement. The outboard set of bolts 278 is then removed, whereupon the disk may be rotated to the new position. The outboard bolts are then replaced whereupon both sets of bolts can be retightened. When all the inserts are expended, a replacement carrier body with additional inserts may be installed. The expended inserts in the removed carrier body may then be replaced, readying that carrier body for subsequent reinstallation.

A more highly automated system may replace the bolted plate 274 with an actuator such as a pneumatic piston mechanism operating on a gas with identical composition to that within the reactor so that the operation does not introduce the possibility of contamination. Additionally, the spider and/or the ring may be automatedly moveable with an actuation system (not shown) providing continuous adjustment of vertical position to control the distance between the electrodes and, thereby, the length of wire to be exploded.

The spark gap assembly 300 (FIG. 9) provides an externally-triggerable high voltage, high current switch interposed between the energy storage system and the central bus-bar of the high voltage electrode assembly. It is rated appropriately for the required service, namely discharges of up to 0.1 Coulomb at 60kV repeated up to several times per second and with the highest possible reliability. The assembly 300 includes a pair of upper and lower metal blocks 302 and 303, the blocks being preferably six inches (15 cm) in diameter, 3.5 inches (9 cm) thick, and made of electrolytic grade copper. The blocks are opposed and separated by means of a circle of rigid insulating rods 304 of appropriate length (e.g., approximately 4 inches (10 cm)) and preferably six in number, the rods preferably of G-10 or the like and having an exemplary diameter of ¾ inch (2 cm), and being fitted with thread inserts into which are threaded bolts 306 passing through counterbored clearance holes in the blocks 302 and 303.

The blocks have opposed threaded internal cavities into which a correspondingly externally threaded electrode insert 308, 309 is threaded. The inserts are preferably about 4 inches (10 cm) in diameter, 2.5 inches (6 cm) thick and formed of electrolytic grade copper. Each insert carries an array (e.g., a four by four rectangular array of sixteen) of electrode tips 310 carried in tapered bores extending from the inboard surface of the insert and secured thereto via bolts 312 extending from counterbores in the outboard insert surface. The tips 310 are advantageously formed of a refractory metal such as a 70% tungsten-30% copper sinter. The exemplary tips are 0.5 inch (1.3 cm) in nominal diameter and 1 inch (2.5 cm) in overall length, with a slight taper complementary to that of the associated bore for high engagement forces and good electrical contact. A gap 314 is defined between the opposed arrays of tips 310. The tips have hemispherical polished inboard ends 316. A gap spacing 318 is the distance between ends of the tips in the opposed arrays.

The upper surface of the upper block 302 is provided with a compartment of complementary taper to that of the bottom end of the bus-bar 206. The compartment receives the bus-bar bottom end (not shown in FIG. 9) and is secured thereto via a machine screw 320 extending upward through a counterbored hole in the block. The lower block 303 is connected to a metal disk 324 such as via a bolt 326. The exemplary disk 324 is formed of electrolytic-grade copper 10 inches (25 cm) in diameter and 0.5 inch (1.3 cm) thick. An upper surface of the disk bears against a lower surface of the block 303 with a central upwardly-directed tapered boss 328 of the disk engaging a complementary tapered compartment for improved electrical contact. A circle of additional machine screws (not shown) may also be provided to further secure the disk to the block. The disk 324 also includes a circle of holes providing access to the bolts 306 in the lower block and has an outboard array of mounting holes 330 (discussed below).

Figure 10:
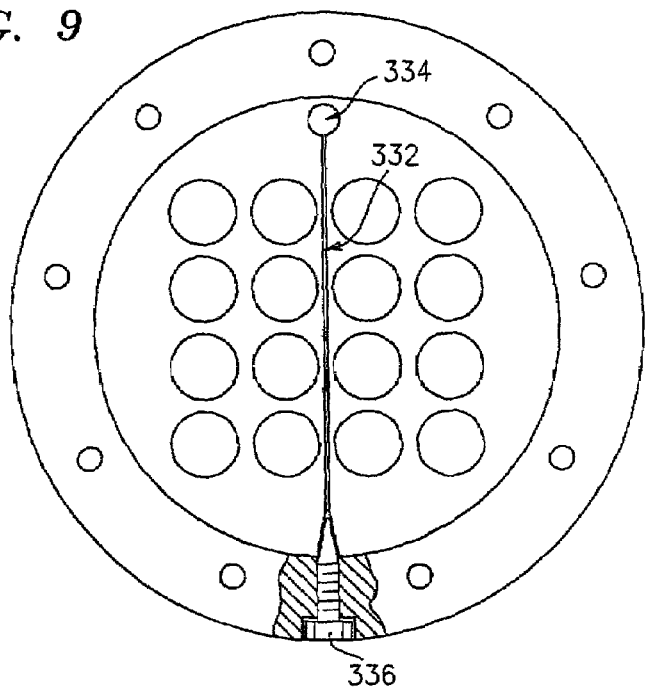
FIG. 10 is an end view of one end assembly of the gap of FIG. 9.

The vertical positions of the inserts 308 and 309 may be controlled via rotation of such inserts, due to their external threading. This can provide for control over the gap 11 distance or spacing 318. To maintain good electrical contact, however, it is desirable that there be high engagement forces between the inserts and the associated blocks. To do this, each insert has a diametric longitudinal cut 332 (FIG. 10) extending nearly entirely through the insert from one side and terminating at a stress relief channel 334. An exemplary cut is 0.05 inch (0.13 cm) across and an exemplary stress relief channel is 0.25 inch (0.6 cm) in diameter. The cut may be formed by electro-discharge machining (EDM). The remaining material beyond the channel provides a hinge. The portions (the halves) of the insert on opposite sides of the cut may be driven away from each other via the action of conically tipped machine screws 336 extending through the associated block and in threaded engagement therewith. The conical tips of the screws (an exemplary 2 screws per insert, longitudinally spaced from each other) engage mating angled surfaces along the opening of the cut so that tightening of the screws drives the halves apart and into firm engagement with the block interior. Loosening of the screws permits relaxation of the insert, reducing engagement forces with the block and permitting the insert to be rotated. The screw heads are advantageously accommodated in a milled vertical slot in the lateral surface of the associated block and engaged thread inserts in the block. Loosening of the screws to fully withdraw them from the cuts permits the associated insert to be rotated by 360° increments to provide vertical position adjustment and thus gap spacing adjustment. The gap spacing is advantageously adjusted to respond to a specific triggering input while not suffering breakdown in the absence of such input. Triggering of the spark gap is accomplished by means of an insulated trigger cable 340 attached to the upper block and connected to a pulse generator 341 of appropriate output. The preferred spark-gap trigger device is a high-voltage pulse transformer with at least 100:1 step-up, such that application of a sufficient current pulse to the primary winding causes a pulse of not less than 20kV amplitude and of polarity opposite to the EEW voltage to appear on the secondary winding, the latter being connected to the trigger electrode 340 of the spark gap. A pulse autotransformer with equivalent step-up may also be used. Particularly effective and reliable is an automobile sparking coil powered by an electronic ignition module, timed to fire when the wire tip has reached proximity to the high-voltage discharge electrode 210. An electronically-pulsed tesla coil (resonant radiofrequency autotransformer) placed a few inches lateral to the spark gap is also an effective trigger. A fan 342 (FIG. 22) serves both to cool the gap and to remove residual ionized air, thus quickly restoring the gap hold-off voltage after breakdown.

Figure 9:
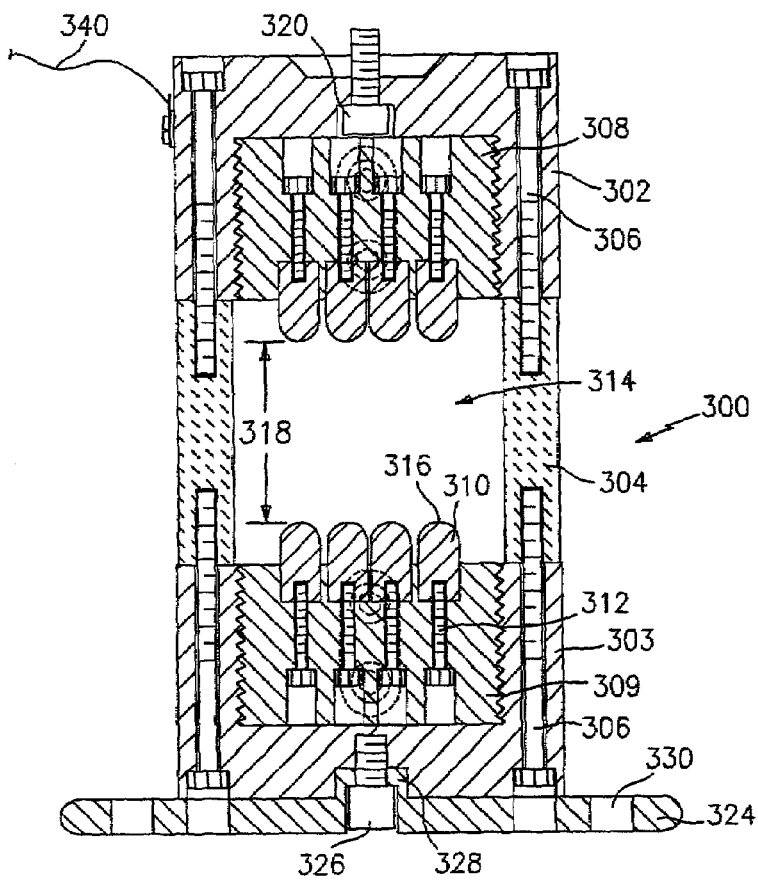
FIG. 9 is a vertical sectional view of a spark gap apparatus of the system of FIG. 1.
Figure 11:
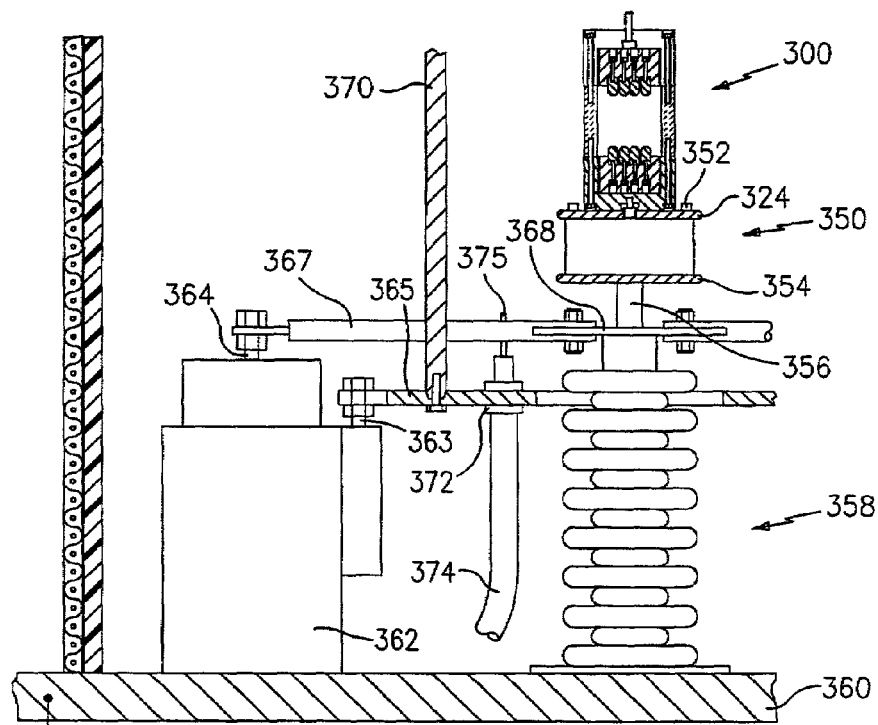
FIG. 11 is a partial view of a high voltage electrical subsystem of the system of FIG. 1.

FIG. 11 shows the plate 324 connecting the lower block of the spark gap assembly to a variable inductor 350 via a plurality of bolts 352 (extending through the mounting holes 330 of FIG. 9). An opposite plate 354 similarly connects the inductor to a central high voltage bus-bar 356 which is supported by an insulator stack 358 which is in turn supported on a pallet 360. Surrounding the insulator, the pallet also supports a ring of capacitors 362. Each capacitor has a ground terminal 363 and a high voltage terminal 364. The ground terminals are connected to an annular ground yoke 365 having a central aperture accommodating the insulator stack. Preferably, the yoke 365 has at its perimeter a number of equi-spaced slots, equal in number to the number of capacitors, each about 2 inches (5 cm) deep and of sufficient width to accommodate the ground terminal. The use of slots rather than through-holes permits any failed capacitor to be easily removed and replaced. The high voltage terminals are connected via a corresponding plurality of radial bus-bars 367 to a central disk 368 to which the lower end of the vertical bus-bar 356 is connected. A plurality of vertical bus-bars 370 connect the ground yoke 365 to the reactor bottom flange (FIG. 1) and hence via the reactor vessel wall to the grounding electrode assembly 200. Advantageously the bus-bars 370 pass through associated apertures in the bottom plate 134 to avoid passing a return current through any flange-to-flange contacts, thereby assuring a low resistance current path. The yoke 365 also carries (via an connector 372) a high voltage cable 374, the center conductor 375 of which is connected to one of the high-voltage bus-bars 367 connected in circuit. The connector 372 provides for electrical contact between the shield of the cable 374 and the ground yoke. The high voltage cable connects the gap to a remotely adjustable power supply 376.

Figure 12:
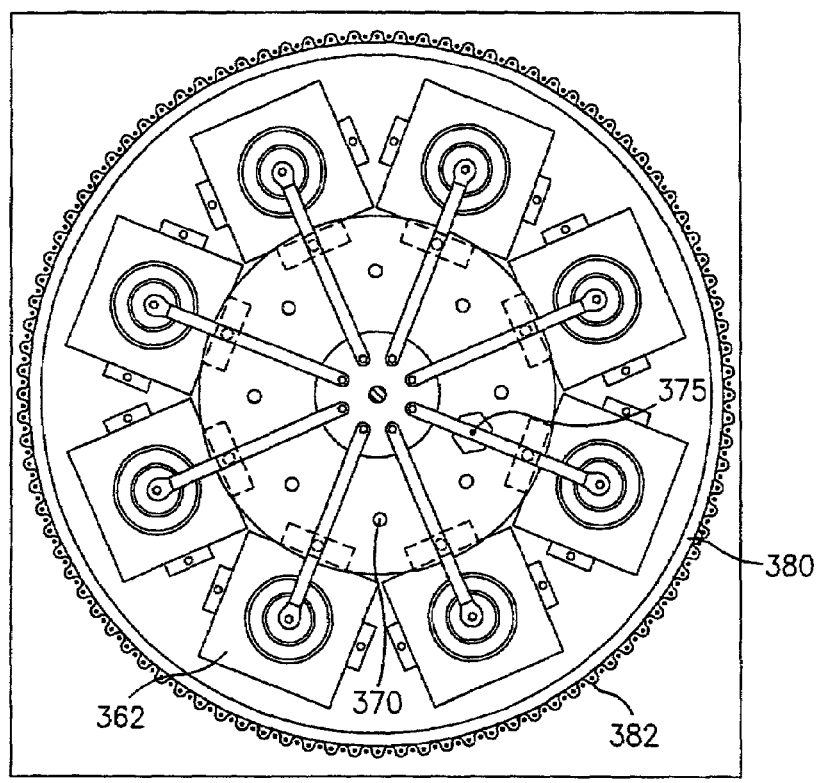
FIG. 12 is a top view of the subsystem of 11.

FIG. 12 shows the circle of capacitors surrounded by a cylindrical polycarbonate shield 380 to catch oil or solid debris which may be ejected in the event of a disruptive capacitor failure. The shield 380 is itself surrounded by a cylindrical Faraday cage 382 formed of finely woven copper mesh to attenuate electromagnetic noise radiated during discharge.

Returning to FIG. 1, the wire feed system 30 draws the wire endwise from a spool 400 (FIG. 1) and delivers it to the reactor. A straightening mechanism 402 is provided receiving the wire from the spool via one or more pulleys and delivering the wire to the reactor along its central axis 104.

Figure 13:
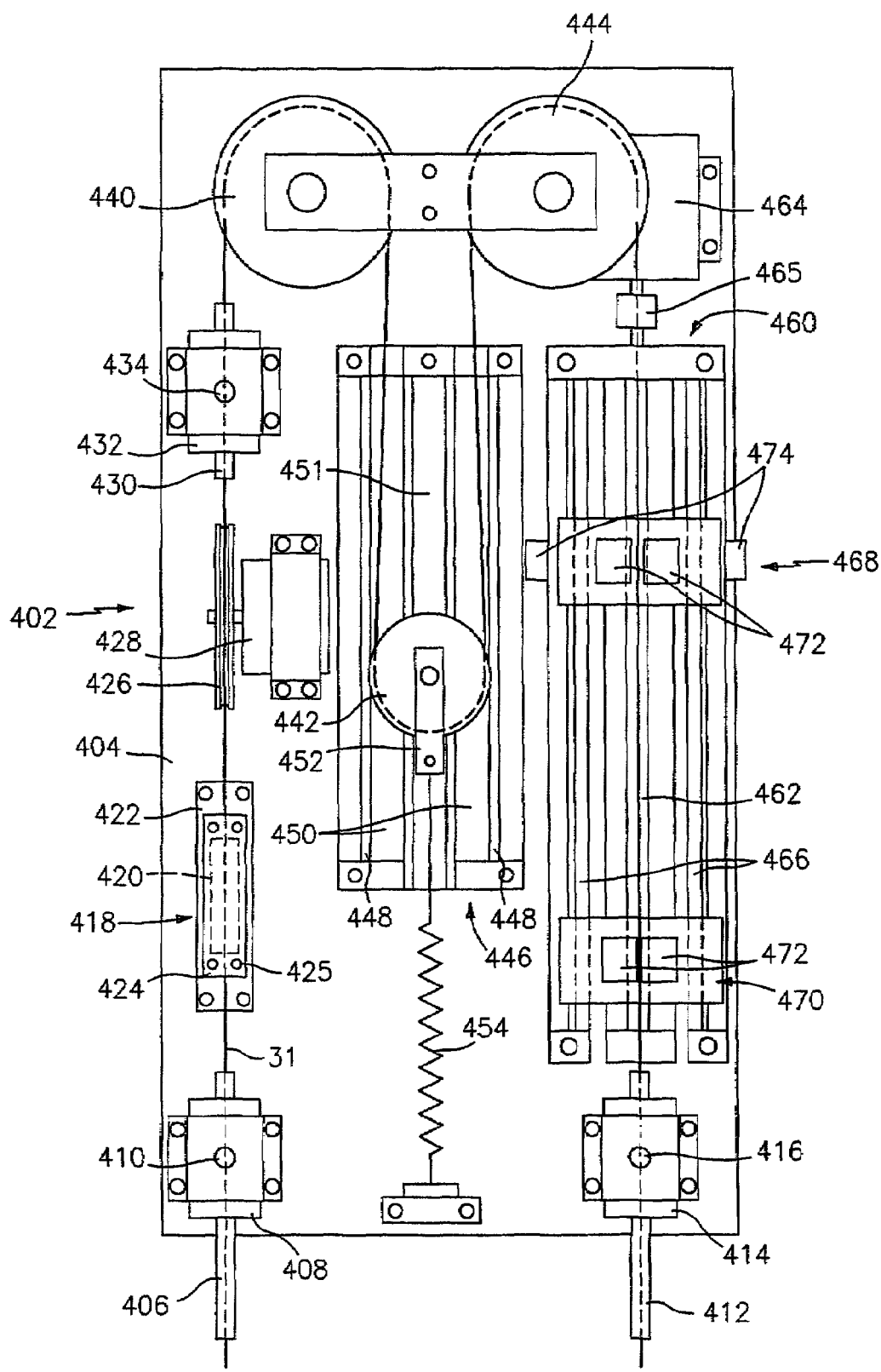
FIG. 13 is a frontal view of a wire feed apparatus of the system of FIG. 1.

Shown in further detail in FIG. 13, the mechanism includes a vertically-extending flat metal base plate 404 upon which a variety of components are mounted. An exemplary material for the base plate is precision-ground aluminum 36 inches (91.44 cm) long (high), 18 inches (45 cm) wide, and 0.5 inch (1.3 cm) thick. From upstream, the wire enters the mechanism via passing through an inlet guide tube 406 carried by an insulating block 408 mounted at a lower left corner of the plate which also carries a wire sensor 410. A similar outlet tube 412, block 414 and sensor 416 are provided at the lower right corner of the plate. Exemplary tube material is stainless steel and insulating block material is G-10 while an exemplary wire sensor is an electro-optic sensor. The tube functions to guide the wire while the sensor is connected to the bus of the control/monitoring subsystem for sensing wire-out conditions and providing the opportunity to hook up a fresh spool.

Downstream of the inlet tube 406, the wire passes through a friction brake 418 which resists motion of the wire along the path. An exemplary brake is formed by two facing layers of loop-type hook and loop fastener material 420 sandwiched between a base block 422 mounted on the plate and a second block 424 mounted to the base block by means of screws 425. The friction brake functions to maintain sufficient wire tension upstream of the hysteresis brake so that the wire retains tractive contact with the pulley 426 at all times. Adjustment of the screws permits adjustment of the compression force between the blocks and, thereby the frictional engagement forces between the material 420 and the wire 31. Downstream of the brake 418, the wire passes around a pulley 426 mounted on the shaft of a magnetic hysteresis brake 428 which is mounted on the plate. The hysteresis brake functions to provide an actively-controlled retarding force to the advancement of the wire. Advantageously, the wire remains in a single plane during its travel along the mechanism 402 except for the local excursion due to wrapping around the pulley 426.

After exiting the pulley, the wire passes through an intermediate guide tube 430 mounted in an insulating block 432 which also carries a sensor 434. Upon exiting the intermediate guide tube, the wire passes over a first fixed-axis non-driven pulley 440. It then passes around a moveable non-driven pulley 442 and then a second fixed-axis non-driven pulley 444. The moveable pulley 442 is carried on a carrier 446. The carrier 446 includes a pair of fixed spaced apart guide rods 448. The pulley 442 is captured between the guide rods 448, however the fit is sufficiently loose to allow the pulley to reciprocally slide up and down. An exemplary pulley 442 is a 4 inch (10 cm) diameter, 0.5 inch (1.3 cm) V groove plastic pulley such as formed of glass-reinforced nylon. A pair of low friction blocks 450 (e.g., of PTFE) locates the rear flange of the pulley and further guides it along its up and down reciprocations. A channel 451 between the two blocks 450 accommodates the pulley stirrup 452 which is coupled to one end of a tension spring 454, the other end of which is held by a fixture on the plate. A weight or other tensioning device may be used in place of the spring 454. The spring 454 serves to downwardly-bias the pulley and place tension on the wire so as to take up and play out the wire, preventing slack.

Between exiting the pulley 444 and entering the outlet guide tube 412, the wire passes through a stretching mechanism 460. The stretching mechanism includes a recirculating-ball leadscrew 462 driven by a fast high-torque stepper motor 464 by means of a coupler 465. The leadscrew 462 is held for rotation about its central axis by a fixture which also holds two fixed rails 466. Carried by the rails are upper and lower clamps 468 and 470. Each clamp has an openable and closeable pair of jaws 472. The upper clamp 468 is preferably fixedly mounted at a user-adjustable height such as by means of locking screws 474. The lower clamp 470 acts as a rider on the leadscrew, so that rotation of the leadscrew about its axis can drive the clamp 470 upward or downward depending on the direction of rotation. The clamp jaws are preferably pneumatically actuated under control of the control/monitoring subsystem between a closed position (shown for the jaws of the lower clamp) and an open position (shown for the jaws of the upper clamp). In the open position, the wire is free to pass between the jaws whereas in the closed position the wire is compressed between the jaws in tight frictional engagement. An exemplary motor 464 is the model UPK599BHA of Oriental Motor Inc., Fairfield, N.J. An exemplary leadscrew is the MONOCARRIER of NSK, Bloomingdale, Ill., having a pitch of between 0.5 and 1.0 inch (1.3 and 2.5 cm) and a stroke length of between 10 and 15 inches (25 and 38 cm). Exemplary pneumatic clamps are the SPG 200 of Fabco-Air, Gainesville, Fla.

Figure 14:
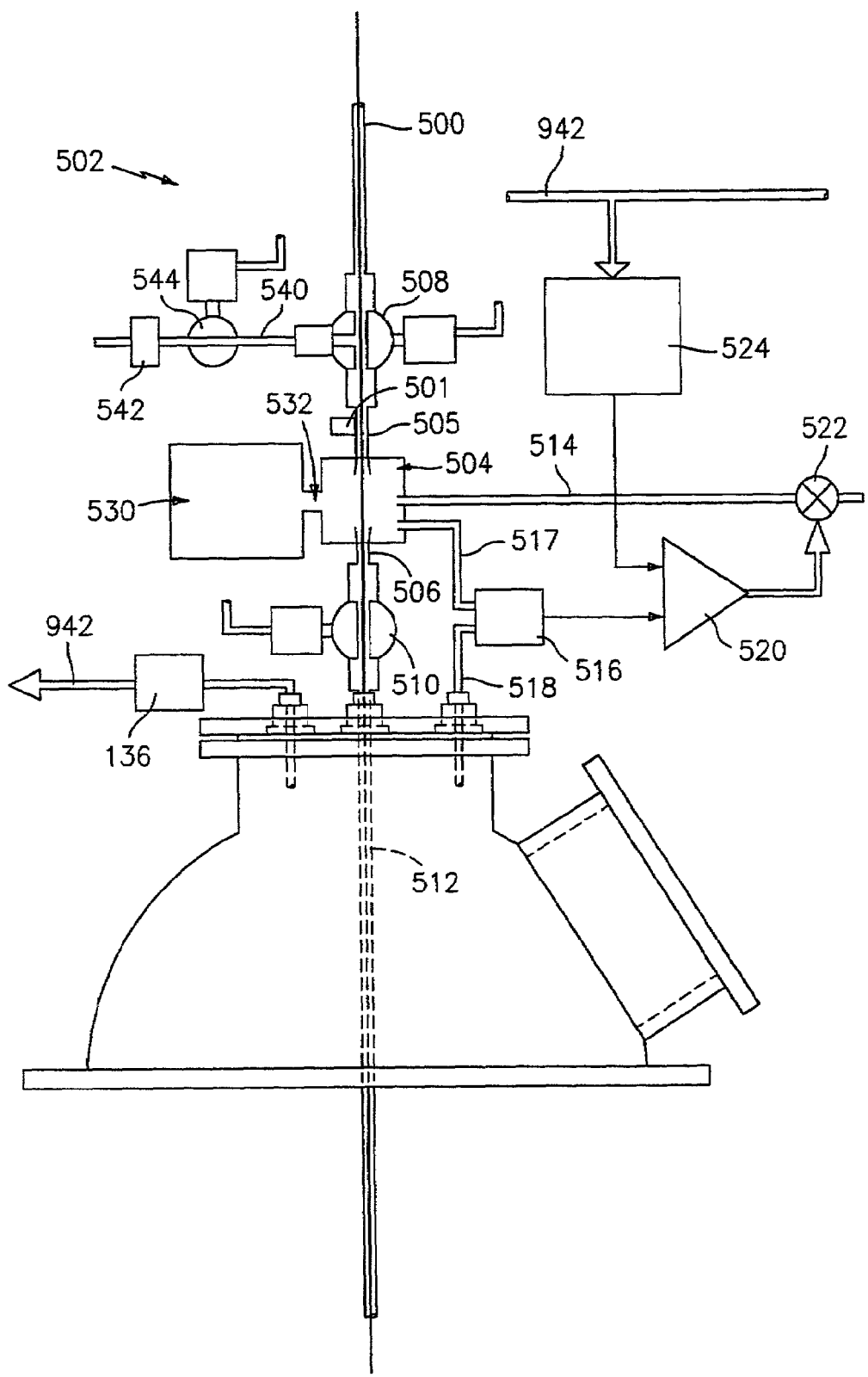
FIG. 14 is a partially schematic view of a pressure balancing apparatus of the system of FIG. 1.

After exiting the outlet guide tube 412, the wire passes directly below to an inlet tube 500 (FIG. 14) of a pressure balancing system 502 which admits the wire to the reaction chamber and prevents significant escape of gas from the chamber into the ambient factory/laboratory atmosphere in which the wire straightening mechanism preferably exists. The pressure balancing system includes a balancing chamber 504. A chamber inlet tube 505 introduces the wire to the chamber 504 while a chamber outlet tube 506 carries the wire away from the chamber. A three-way ball valve 508 couples the chamber inlet tube 505 to the coaxial inlet tube 500. A similar two-way ball valve 510 couples the chamber outlet tube 506 to a balancing system outlet tube 512 delivering the wire into the reaction chamber and thus functioning as a wire inlet tube to the reactor chamber. A gas inlet tube 514 delivers a pressure balancing gas to the pressure balancing chamber. A pressure differential sensor 516 is preferably coupled by tubes 517 and 518 to the pressure balancing chamber and reaction chamber, respectively, to measure a pressure difference between the two. In operation, output of the pressure differential sensor is directed to a differential error amplifier 520 which controls a valve 522 admitting gas to the pressure balancing chamber via the tube 514. A digital-to-analog converter 524 is a node on the bus of the control and monitoring subsystem and receives therefrom a target pressure differential set point for controlling the error amplifier and in turn the valve 522 to admit balancing gas to the balancing chamber until the pressure in the balancing chamber is within a desired amount of the pressure in the reaction chamber. Advantageously, the pressure in the balancing chamber will be slightly less than that in the reaction chamber (e.g., by 0.01–0.1 psi (70–700 Pa)). For stability, a pressure ballasting chamber 530 may be coupled to the balancing chamber 504 via a conduit or constriction 532. The ballasting chamber can stabilize feedback problems associated with automated operation of the valve 522.

Operation of the pressure balancing system is as follows. The internal cross-sectional area of the tube 505 (or another element upstream of the interior of the balancing chamber 504) is chosen to be a reasonably minimum, for example, a circular tube with an interior diameter as little as practicable greater than the wire diameter if the wire has a substantially circular cross-section. The internal cross-sectional area of the tube 506 or other location downstream of the balancing chamber interior is somewhat greater. With the balancing gas maintaining a pressure in the balancing chamber only slightly less than that in the reaction 30 chamber, there will be a slight flow of gas from the reaction chamber to the balancing chamber. With the relatively higher pressure difference between the balancing chamber and atmosphere, there will be a higher flow of gas from the balancing chamber upstream along the wire flow path to atmosphere. However, the majority of this gas will advantageously be the balancing gas delivered via the tube 514, with only a relatively small portion having come from the reaction chamber. Accordingly, such a system can minimize loss of reaction gas. In an exemplary embodiment, the minimum and principal internal diameters (ID) of the tubes 500 and 505 are preferably 1.40–2.29 mm, for a cross-sectional area of 1.5–4.1 mm$^2$. Similarly, the principal/miminum ID of the tubes 506 and 512 is 3.05–4.65 mm, for a cross-sectional area of 7.3–17.0 mm$^2$. The choice of inlet tube size is a compromise between allowing sufficiently free passage of the wire and minimizing the escape rate of gas from the balancing chamber. Given available commercial tube sizes, this will be substantially larger than the wire section. Since the pressure difference across the outlet tube is fairly small, this can have a relatively large ID providing additional advantages of mechanical rigidity which help maintain precise alignment of the wire with the electrode aperture. By way of comparison, an exemplary 26 gauge wire has a pre-stretched diameter of 0.404 mm and cross-sectional area of 0.128 mm$^2$. Post-stretch values would be approximately 5 and 10% less, respectively. The clearance between the wire and the tubes can provide significant flexibility for use of somewhat larger or even smaller wires.

Before the wire is introduced to the balancing system, the ball of the valve 508 may be rotated to block the tube 500 and establish communication between the tube 505 and a tube 540 which leads to a flow meter 542. A solenoid-operated toggle valve 544 providing for optional isolation of the balance chamber if required is located along the tube 540 between the valve 508 and the flow meter 542. An exemplary flow meter is of the mass flow type such as the GFC17 of Alborg Instruments, Orangeburg, N.Y. If the flow meter is connected to the data bus, it can provide a measurement of gas lost from the pressure balancing chamber. Because the wire section represents a small fraction of the sections of the tubes through which it passes, these flow measurements can be used to estimate what the loss will be when the wire is in place. Exemplary ball valves are available from Swagelock Co., Solon, Ohio. Exemplary spring-return pneumatic actuators for the ball valves are available from Whitey Co., Highland Park, Ohio. An exemplary pressure differential sensor is the PMP 4170 of Druck, New Fairfield, Conn.

At the instant of firing, all devices in the wire path jump transiently to the potential of the energy storage system. To ensure that the grounding discharge takes place only at the knife-edge aperture 261, no other part of the wire path is allowed direct contact with ground, or proximity thereto sufficient for arcing to occur. Thus, the wire infeed tube 512 and pressure-sensor tubes 518 are introduced into the reaction chamber through insulative (e.g., PTFE) plugs, all gas lines in the wire feed system are reinforced insulative (e.g., plastic) hoses, all pulleys guiding the wire are insulative (e.g., glass-reinforced nylon), and all devices in contact with or in proximity to the wire (including the wire spool 400, friction brake 418 and clamps 468, 470) are insulated to withstand a potential of at least 60 kV relative to ground. Wire feed sensors 410, 416, 434 are preferably coupled to the wire path by optical fibers of at least several inches length. For operator safety, all high voltage devices are disabled and grounded during spool changing or wire feed maintainance.

Figure 15:
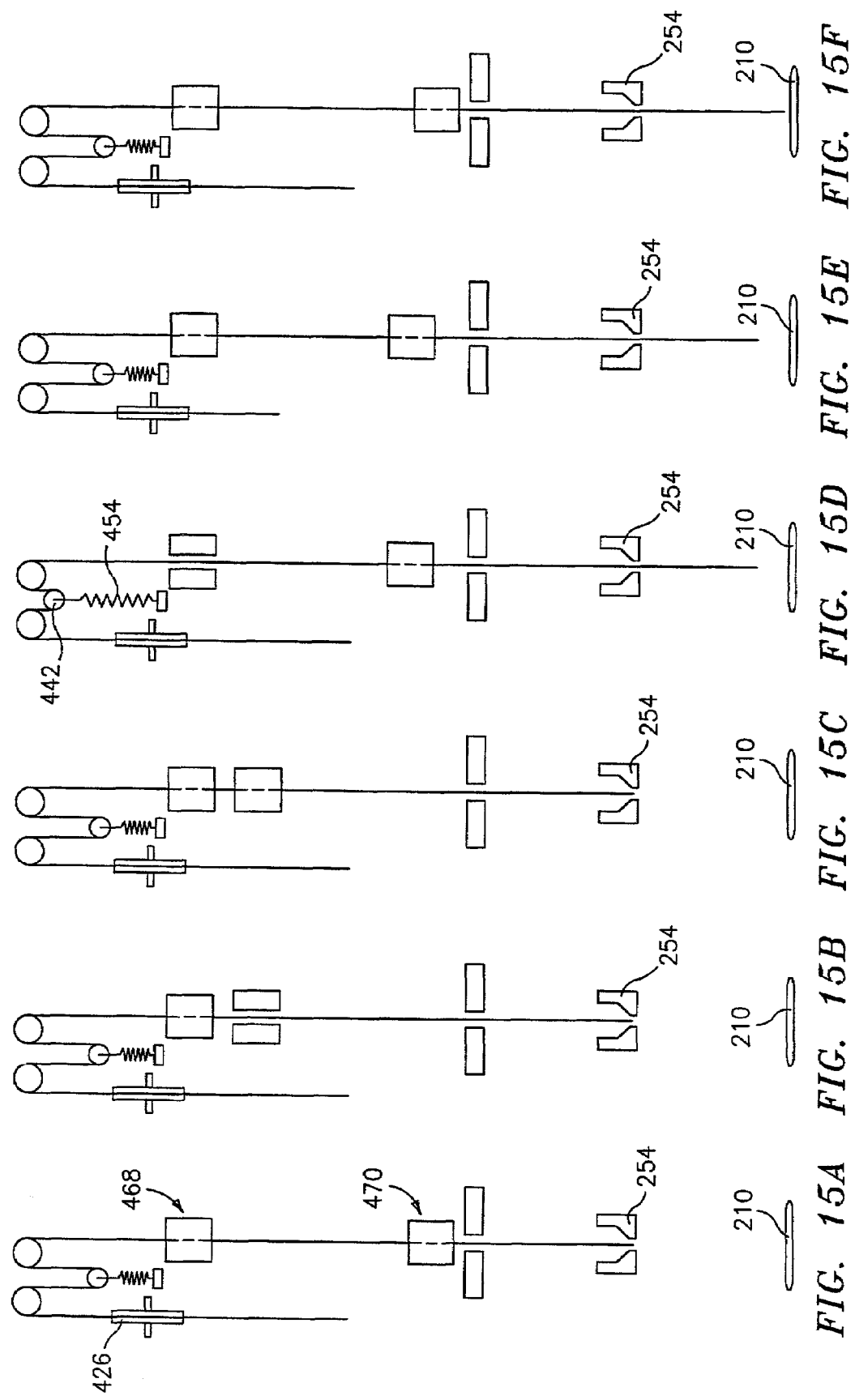
FIGS. 15A–15F are schematic views of a sequence of operations of the wire feed apparatus of FIG. 13.

Returning to FIG. 2, it is seen that the downstream end or outlet of the balancing system outlet tube 512 is just above the grounding electrode assembly 200. As noted above, each explosion removes the terminal length of wire below the grounding electrode assembly. The next length must be fed downward to an operative position whereupon the end of the wire is adjacent or contacting the upper surface of the high voltage electrode disk 210 whereupon the next explosion may be triggered and the process repeated. FIGS. 15A–15F show, in schematic form, a sequence of wire feed operations. In an initial position of FIG. 15A, the jaws of the upper 468 and lower 470 clamps are closed and the lower clamp is in a lowermost position. The jaws of the lower clamp are then opened whereupon it may be raised to an uppermost position (FIG. 15B). Its jaws are then closed to grip the wire (FIG. 15C). The jaws of the upper clamp are then opened and the hysteresis brake controlling the pulley 426 is locked. The lower clamp is then driven downward to a target position, slightly above its initial lowermost position (FIG. 15D). During this movement of the lower clamp, the pulley 442 is raised by the wire and the spring 454 correspondingly stretched. The upper clamp then grips the wire (FIG. 15E) and further wire, appropriately tensioned by the hysteresis brake, is drawn from the spool as the spring 454 relaxes, drawing the pulley 442 back down to its initial position. With the upper clamp still engaged, the lower clamp is driven further downward to its initial lowermost position (FIG. 15F). This last movement has two accomplishments: first, it brings the tip of the wire into operative proximity to the disk 210 for the next explosion; and, second, it produces an inelastic stretch of the length of wire between the two clamps. This inelastic stretch straightens that length of wire which allows it to be more readily fed into the reactor. The distance between clamps (upper extremity of lower clamp jaws gripping wire to lower extremity of upper clamp jaws) in the initial position is approximately 1–10% longer than the distance with the lower clamp in its target position of FIG. 15E. Thus the corresponding inelastic stretch is between 1 and 10 percent.

The stretched length of the wire between the clamps is advantageously the same as the length of wire which is exploded between the upper surface of high voltage electrode 210 and the aperture surface 261 of the grounding electrode. For precise infeed, the distance between the aperture surface 261 and the upper extremity of the lower clamp in the initial position is advantageously equal to or an integer multiple of this stretched length.

Upon detection of a wire-out condition by the sensors in the wire feed system, the control and monitoring subsystem initiates shutdown of wire feed and explosion operations and alerts an operator. The operator removes the remaining length of wire from the system and begins feeding a wire from a replacement spool into the system. Advantageously, the replacement procedure places the system in exactly the same condition as immediately after an explosion during normal operation with a pre-stretched length of wire terminating immediately at the grounding electrode where wire is otherwise cleaved by the explosion. Proper prestraightening can entail a number of steps. By way of example, after feeding the wire through the straightening mechanism to the stretching mechanism, the operator opens the clamps and raises the lower clamp to the target position of FIG. 15D. Wire is further fed until the wire tip is slightly (e.g., 0.5 cm) below the lower extremity of the lower clamp. With the wire kept manually under tension, the operator closes both clamps to grip the wire. The lower clamp is then moved downward from its initial position prestretching the length of wire between the clamps. However, at this point, the section of wire within the jaw of the lower clamp (and any small increment extending below) has not been stretched and retains its original curl. The lower clamp is then opened and raised by an amount equal to its own width (length along the wire path) and reclamped. The unstretched segment of wire now lies exactly below the lower extremity of the jaws and may be cut by means of a wire cutter or the like. The lower clamp may be again opened and raised by an amount equal to the distance from the bottom of the feed stroke to the mouth of the inlet tube 500 of the pressure balancing system. The lower clamp is then reclosed, the upper clamp opened, and a downward feedstroke executed including closing of the upper clamp and the final stretch increment. Straightened wire now exists from the upper clamp down to the mouth of the inlet tube. The upper and lower clamps are again opened and the operator carefully pulls the wire downward such that its tip enters the mouth of the tube by a distance of about 0.5 inch (1.3 cm). The lower clamp is then raised, closed, and then slowly lowered until commanded to stop by a sensor 501 in the balancing system (preferably in the tube 505) located a known distance above the grounding electrode aperture surface 261. The upper clamp is closed and the lower clamp is then raised by that same distance whereupon the lower clamp is reclosed, the upper clamp reopened, and a wire feed executed with the terminal stretch. At the conclusion of this operation, the wire tip is located at the desired location adjacent to the surface 261 and ready for the first feed cycle.

Figure 16:
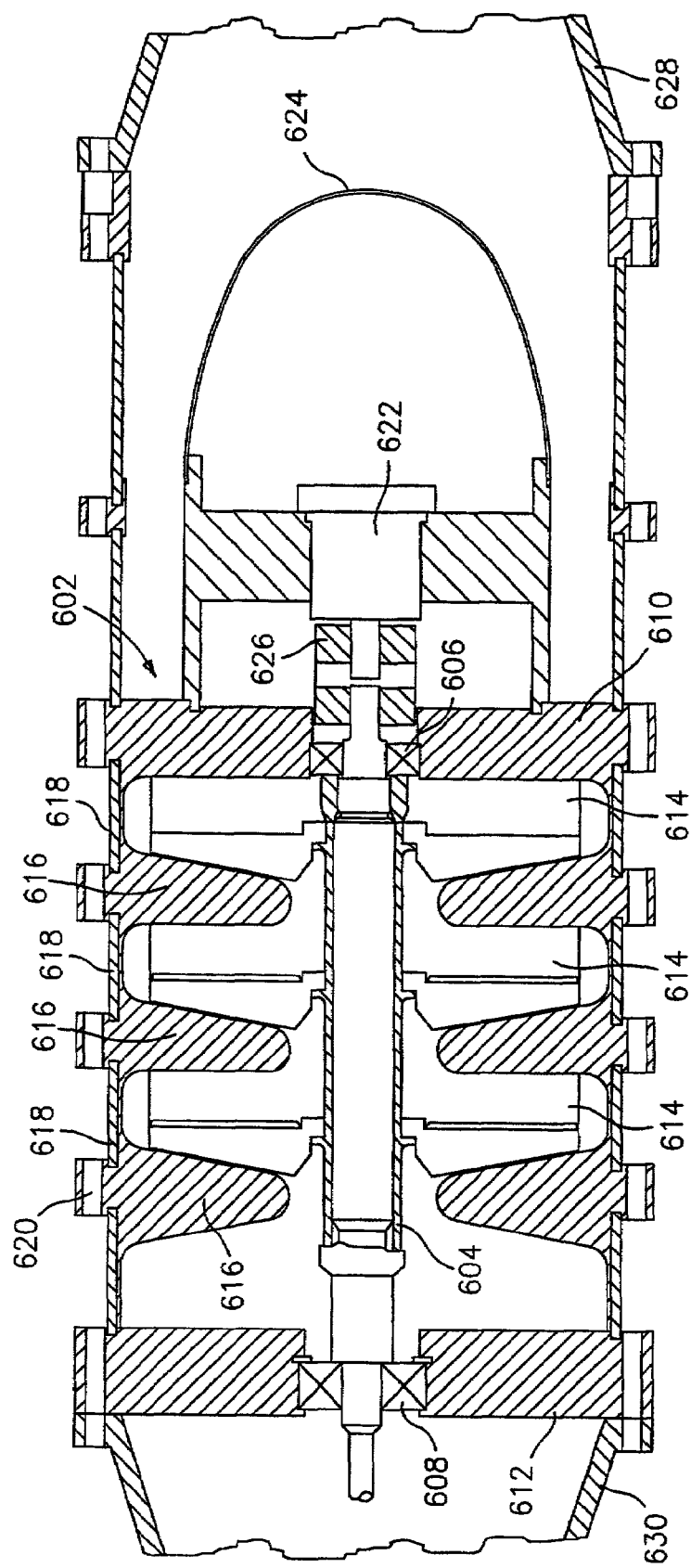
FIG. 16 is a partially schematic sectional view of a turbine compressor of the system of FIG. 1.

Returning to FIG. 1, it is seen that closed loop circulation along the recirculating flow path is driven by a turbine unit 600 within the gas handling subsystem. The turbine unit is advantageously located upstream of the reactor and downstream of the extractor. The turbine unit includes a compressor 602 (FIG. 16) preferably of at least three stages. The compressor includes a splined shaft 604 mounted in upstream and downstream high speed bearings 606 and 608 respectively carried in spiders 610 and 612 extending inward from external ductwork and structural supports. The shaft carries three impeller rotors 614 each having a plurality of blades. Downstream of each rotor is an associated stator 616 located relative to the rotors by means of spacer rings 618. The stators are preferably sealed with annular gaskets (not shown) of 6061 aluminum and symmetrically longitudinally compressed by means of a circle of twelve equally-spaced tie rods running the length of the turbine unit through holes 620 in the stator sections and aligned holes in additional structural elements. Exemplary tie rods are formed of 4130 steel with rolled threads. The compressor is powered by a hydraulic motor 622 located within an central inlet shroud 624 and connected to the shaft via a coupling 626. An exemplary motor is the A2F5W60B3 of Mannesmann-Rexroth, Bridgewater, Mass. The motor is driven by high pressure hydraulic fluid from a hydraulic power unit 627 (FIG. 1) external to the turbine. An exemplary hydraulic power unit is available from Pearse-Pearson Co., Bloomfield, Conn. Gas inlet to the turbine is through a diverging duct portion 628 while gas outlet is through a converging duct portion 630. A pair of diagonally-extending upstream and downstream baffles 632 and 634 (FIG. 1), respectively, are mounted within a section of the ductwork section between the turbine unit 600 and the reactor. Each baffle extends more than halfway across the duct section so that if viewed longitudinally along the flow path, the two overlap between two chordlines of the section. The exemplary baffles are formed of stainless steel and, on at least one face, have an elastomeric (e.g., rubber) or other deadening layer. Preferably such layer is at least on the downstream face of the upstream baffle and the upstream face of the downstream baffle and serves to substantially prevent a shock wave from the wire explosion from reaching the turbine.

Continuing along the recirculation flow path, after the reactor gas exits the turbine unit and baffles, it enters the reactor inlet port 130, therefrom through the dome 120 into the upper portion of the reactor midsection, through the spider plate, through the lower portion of the reactor midsection, and out the outlet duct 110 through the outlet port 112. Immediately downstream of the outlet port 112, in a short section of reactor duct 640, a stub trap is formed. The stub trap comprises an aperture or opening 641 in the bottom of the duct 640 leading via a ball valve 642 to a removable stub container 644. Remaining unexploded pieces of wire are guided by the baffle 140 and outlet duct 110 to the opening and then fall into the stub trap. When the container 644 is full, the valve 642 may be closed and the container removed and emptied whereupon the container may be replaced and the valve opened.

It is of particular importance to cool the powder product before it reaches the extraction device. Without such cooling, the particles may readily fuse together (sinter) upon physical contact. This type of coarsening is undesirable because it (a) reduces the specific surface area of the powder, and (b) depletes the stored excess energy that might usefully be liberated from the powder in energetic applications such as propellants. Advantageously, a major portion of the particles are nonagglomerated (i.e., the particle is a single grain rather than a plurality of distinct grains or subparticles fused together). For these reasons, a long flow path with assisted cooling is provided between the reactor and the extractor. Downstream of the duct 640 is a high intensity cooling section 650 which includes a duct 652 surrounded by a cooling jacket 654. Within the duct 652, additional cooling may be provided. A preferred form of such cooling involves a helicoid (auger) 656 having a central tubular conduit 658. Both the conduit and the cooling jacket advantageously carry a cooling fluid from/to a refrigeration unit 660 of the cooling subsystem 29. Similar cooling jackets may surround substantial additional areas of the flowpath, including, the reactor vessel, the extractor shell, the ducts between the reactor and auger, and the ducts between the extractor and the reactor. The gas flow loop is closed via insertion of a pair of flexible metal couplings or bellows 670 and 672 respectively between the turbine unit and extractor and the helicoid heat exchanger duct 652 and the extractor (FIG. 1).

An exemplary cooling fluid is a 40% (by volume) glycol-water mixture cooled to about −10° C. Exemplary cooling jackets are formed by metal cooling coils (e.g., 0.5 inch (1.3 cm) diameter copper tubing, flattened for enhanced heat transfer) wrapped around and secured to (e.g., by means of soft solder) the exterior of the subject ducts. Such enhanced cooling is desirable to prevent particle agglomeration and the particular auger construction is believed to help provide such cooling without inducing a degree of particle collision which would increase agglomeration. An exemplary auger is formed of a highly polished stainless steel and is fixed within the associated duct. The auger provides enhanced exposure of the particulate-carrying gas to cooled surfaces and imparts a turbulence which may further assist in the prevention of particle agglomeration. An exemplary auger diameter is in the vicinity of 6–8 inches (15–20 cm) and an exemplary length is 4–5 feet (1.2–1.5 m). A second exemplary cooling fluid is boil-off from a liquid nitrogen dewar.

Figure 17:
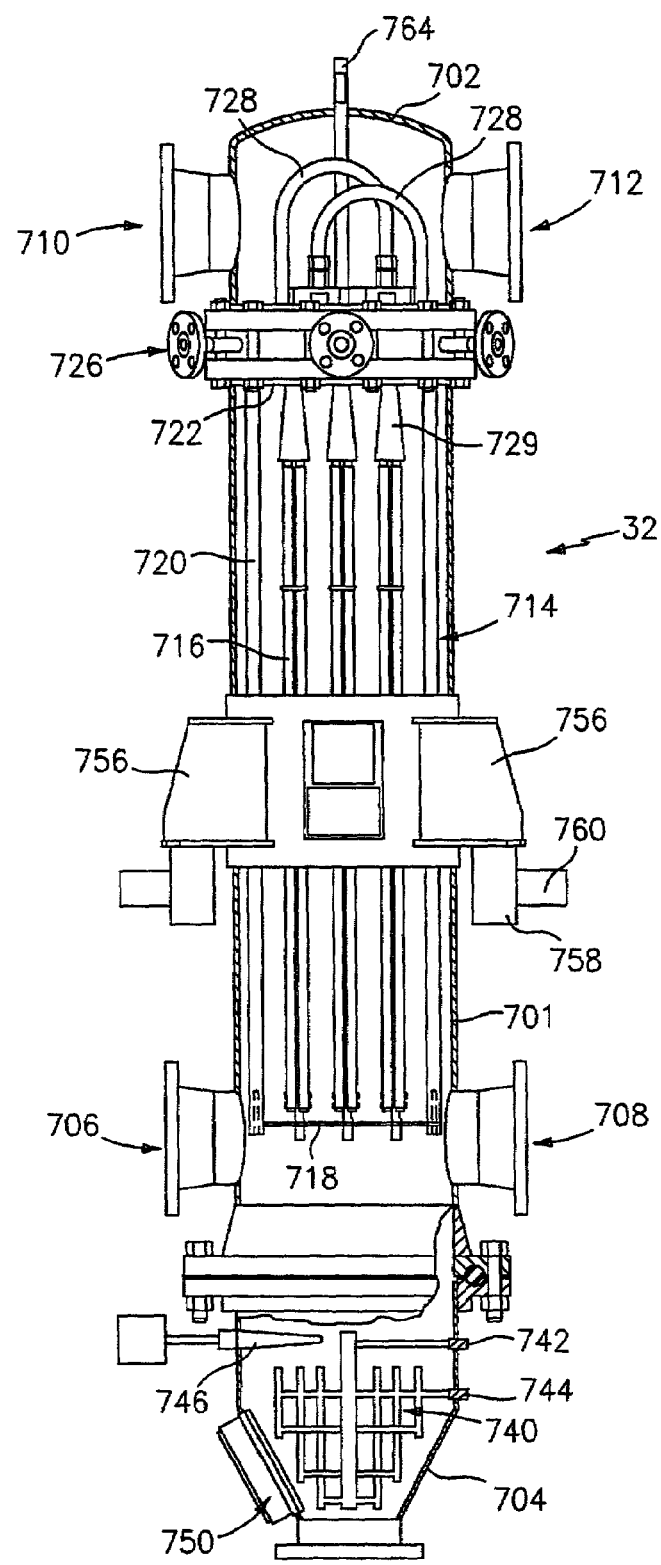
FIG. 17 is a partial vertically cut away view of an extractor apparatus of the system of FIG. 1.
Figure 20:
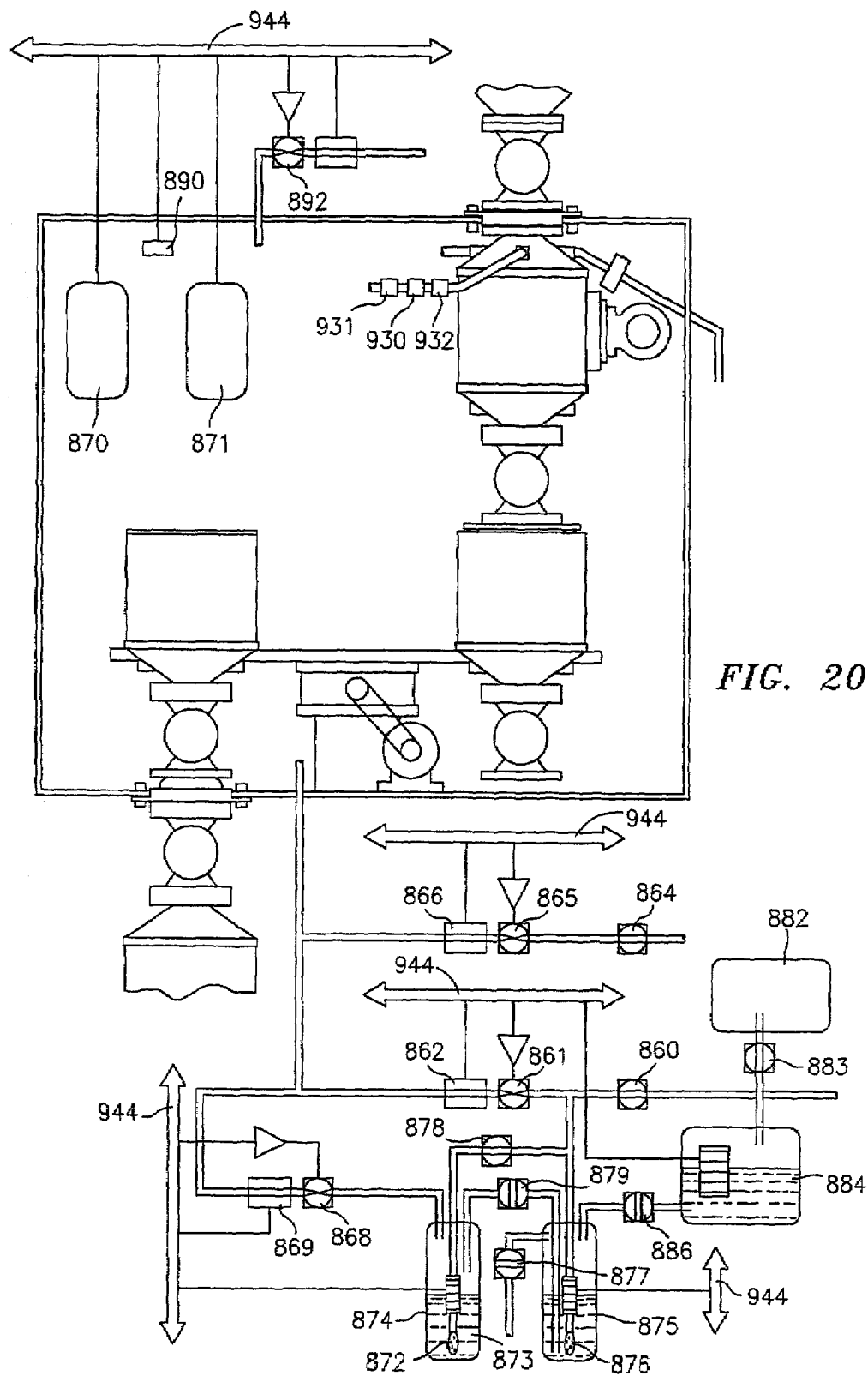
FIG. 20 is a partially schematic view of components of the processing subsystem.

After passing through the auger, the particulate-carrying gas enters the extractor. A preferred extractor 32 (FIG. 17) includes micro-porous filter elements. In distinction to vortex-type extractors and electrostatic precipitators, such filters can achieve virtually 100% efficiency in filtering sub-micron particles even at relatively high gas flow rates associated with sub-second refresh times for the reaction chamber. Recirculation of the generated particles is believed highly detrimental to powder quality. Accordingly, it is advantageous that substantially all particles be prevented from reentering the reaction chamber (e.g., at least 99% by weight and preferably at least 99.9% or more preferably 99.99%). The presence of such particles can also effect turbine life, and the like. The exemplary extractor 32 uses filter technology available from Pall Corporation, Forest Hills, N.Y. The extractor includes a shell 700 formed in large part of a central stainless steel cylindrical section 701, 18 inches (46 cm) in diameter and 9 feet (2.7 m) in length. An upper cover 702 is mounted at the upper end of the central section and a partially frustoconical hopper 704 is mounted at the lower end of the central section. These shell components have sufficient thickness to withstand the maximum anticipated internal operating pressure (e.g., in the vicinity of 150 psia (1 MPa)). The lower end of the central section has a pair of flanged ports 706 and 708. In the exemplary embodiment, the port 706 is coupled to the duct 652 (FIG. 1) to receive particle-containing gas exiting the vicinity of the auger, while the port 708 is capped. Similarly, the cover 702 is provided with a diametrically opposed pair of flanged ports 710 and 712. In the illustrated embodiment of FIG. 1, the port 710 is coupled via ductwork to the turbine unit while the port 712 is capped. Contained within the shell is a filter assembly 714. The exemplary assembly comprises 54 hollow microporous stainless steel tubes 716 bundled into six groups of three triads and mounted in a supporting structure. The triads are rigidly anchored at their lower ends to a transverse structural plate 718 at a height in the vicinity of the ports 706 and 708. The plate 718 is carried via a ring of tensile rods 720 depending from an upper plate or tube sheet 722 carried at the joint between the central section 701 and cover 702. The plate 722 also divides an upper manifold receiving the filtered gas from the interiors of the filter element tubes from a volume below.

A plurality of blowback inlet ports 726 are connected via pipes 728 to nozzles 729 above upper ends of associated groups of filter element triads. In the exemplary embodiment there are six such ports 726 equally spaced around the circumference of the extractor each coupled to an associated nozzles. During normal operation, particulate is trapped on the external surfaces of the filter element tubes. When sufficient material has caked on those tubes, a blowback gas is introduced to the ports 726 at a pressure greater than the static pressure of the gas in the system (e.g., by 10–20 psi (69–138 KPa)). The blowback gas advantageously is of the same composition as the recirculating gas and, for example, may be taken out of the recirculation via a compressor (not shown) and stored in a pressure vessel (not shown) until needed for blowback. In the mouth of each element is sealed a venturi device (not shown), through which the cleaned gas flows into the downstream chamber. When a solenoid valve associated with a given nozzle is opened briefly, a pulse jet of high pressure gas from the nozzle impinges upon the mouths of the venturis served by that nozzle. This creates a large-amplitude acoustic wave which travels down the interior of each associated element, analogous to a briefly excited organ pipe. As it propagates, the wave causes transient reversal of the gas flow through the element, dislodging the cake of particulate. The cake does not disperse (as might be the case for a prolonged blowback) but instead preferably falls as a tubular mass of densified material, down into the collection hopper 704.

The six jet pulse devices can be blown back independently, as for example in an equi-spaced cycle, so as to maintain quasi-constant flow resistance and turbine loading. The exemplary blowback flow is parallel to the external surfaces of the filter elements from their upper ends to their lower ends and ejects or flushes the caked particulate from the external surfaces of the filter elements and permits the caked particulate to fall into the hopper 704. Alternatively, other forms of the blowback operations may be used.

The exemplary hopper 704 has a cylindrical upper section bolted by a flange to the central section 701 and a frustoconical lower section having a flange coupling the extractor to the processing subsystem. In the exemplary embodiment, the powder in the hopper is further cooled by providing a fluid-carrying heat exchanger 740. An exemplary heat exchanger is formed as an labyrinth of vertically-arrayed stainless steel tubes receiving cooling fluid from an inlet connector 742 and returning the coolant to an outlet connector 744. The cooling fluid may be the same as that utilized in the cooling jacket and auger. A powder level sensor 746 coupled to the bus extends into the hopper near the upper end thereof. An exemplary sensor is of the capacitance-sensing type such as available as model COS200 of Milltronics-Pointek, Arlington, Tex. The sensor 746 can sense a full hopper condition whereupon the hopper may be emptied. This may occur after multiple blowback cycles. To assist in emptying the hopper, a bracket 750 is welded to the frustoconical section of the hopper permitting attachment of a vibrator 751 (FIG. 1) to encourage the powder to fall from the hopper. This is further encouraged by providing the interior of the frustoconical section with a mirror finish.

For mounting the extractor in the structural frame of the system, a pair of heavy brackets 756 are provided on a reinforcing girdle located along the shell center section. The brackets retain a pair of carriers 758 which receive pivot axles 760 carried by trunions 762 mounted to the frame (FIG. 1). This permits the extractor to be pivoted about the central axis of the axles 760 (when disconnected from associated ductwork) for intensive cleaning or replacement of filter elements. The filter is further provided with a lifting bracket 764 having an eye for receiving a crane hook for moving the entire extractor. The hopper 704 is coupled via ball valve 770 to the processing subsystem 33 (FIG. 1).

The processing subsystem includes a chamber 800 (FIG. 1) which may contain a controlled processing atmosphere. A glove box 802 preferably contains an inert (e.g., pure argon) atmosphere and provides a user with access to analytical instruments useful for testing samples of the powder. The glove box advantageously contains an inert atmosphere into which samples of the unpassifated powder can be transferred for analysis by an instrumentation package which may include a microbalance, a thermogravimetric analyzer, a differential thermal analyzer, and a particle size analyzer. Powder flow into and out of the chamber is controlled by appropriate valves (described below). FIG. 18 shows the extractor hopper 704 coupled by a transition adapter 772 to the valve 770. Advantageously, the ball and housing of the valve are of stainless steel with a PTFE seat. The ball advantageously provides an aperture of approximately 3 inches (7.6 cm). An exemplary valve is the CFM8 of Warren Valve, Houston, Tex., and is fitted with a pneumatic actuator 774 coupled to the bus. An exemplary actuator is the M22K4 of UniTorq, Norcross, Ga. The valve may be actuated between a closed condition blocking communication and an open position permitting communication. At its downstream end, the valve 770 is coupled to an adapter plate 806 mounted within an upper plate 808 of the enclosure defining the processing chamber 800. The underside of the adapter plate is coupled to an upper flange of an upper transfer lock 810. The exemplary transfer lock has upper and lower frustoconical sections and a central cylindrical section and, like other components, may be formed of stainless steel with appropriate wall thickness (e.g., 0.375 inch (1 cm)). A bracket 811 is secured on the wall of the lock 810 permitting attachment of a vibrator similar to the vibrator 751 to assist material in falling through the lock. Each frustoconical section is provided with a plurality of radial bosses 812 each having a threaded central hole for the insertion of appropriate probes, fittings, and the like, or in their absence plugs. One boss of the upper frustoconical section may carry a sampling device 814 by which small samples of powder falling into the lock through the valve 770 may be extracted for analysis in situ prior to processing. The sampling device comprises a conduit extending through to the glove box and terminating at a removable HEPA filter element. Within the conduit, an electronically-controlled ball valve may be opened to permit flow into the glove box whereupon powder is trapped by the filter and then closed to permit removal of the filter for analysis of such powder. Optionally, an additional sampling device may be provided for analysis of the processed powder. The bosses may receive a fitting connected to a tube 815 of which one is shown to which gas may be introduced to or extracted from the lock. The bottom flange of the lock 810 is connected to the upper flange of a ball valve 820 which may be similar in construction and control to the valve 770. The lower flange of the valve 820 is fitted with a downward-facing inflatable seal 822. The seal 822 can be inflated to engage and seal with an upper rim flange 824 of a processing vessel 826 immediately below. The seal may be deflated to disengage from the processing vessel.

Returning to FIG. 1, it is seen that a plurality of such processing vessels are mounted on a carousel 828 which comprises a generally circular plate 829 rotatable about a central axis 830 by means of a motor 832. In an exemplary embodiment, there are a circle of ten such processing vessels (FIG. 21) mounted in circular holes in the carousel plate, equally spaced circumferentially at a given radius. The exemplary plate is precision ground aluminum, 58 inches (1.5 m) in diameter and 0.625 inch (1.6 cm) thick supported by and bolted to a rotary table raised off of a supporting surface of the frame by a plinth. Around its perimeter, the plate 829 is supported by a plurality of height-adjustable rollers 900 held above the frame. The rollers help carry the weight of the carousel and prevent frame flexing under the weight of the vessels. The exemplary bi-directional DC servo motor 832 is preferably mounted partially within a recess in the plinth. A belt engaged to toothed pulleys on the motor shaft and rotary table driveshaft couples the two so that rotation of the motor causes a corresponding rotation of the carousel plate 829. The pulleys and carousel gearing (if any) are chosen to provide a substantial reduction (e.g., 100:1). A position encoder 902 coupled to the bus reads index marks on the perimeter of the plate 829 to provide precise angular positioning of the plate. The carousel is rotatable to bring the processing vessels through a plurality of positions. A loading position places the associated vessel immediately below the extractor in the operative position of FIG. 18. The other positions are all spaced therefrom about the axis 830 by the angular pitch of the processing vessels on the carousel.

An unloading position may be diametrically opposite the loading position (e.g., as in FIG. 1) or may be adjacent to the loading position. FIG. 19 shows a vessel 826 in the unloading position. The exemplary processing vessel includes an upper cylindrical section and a lower frustoconical section which may be similarly formed to the lower frustoconical section of the transfer lock 810 (e.g., including similar bosses 812). The upper rim flange 824 is secured in the upper end of the cylindrical section and its central aperture 825 defines an inlet port of the vessel. As the transfer lock carries the valve 820, each processing vessel carries an associated ball valve 833. Although otherwise similar to the valves 770 and 820, a preferred embodiment of the valve 833 lacks an individual associated actuator. Rather, a single actuator 834 and associated clutch 835 are operatively positioned adjacent to the vessel unloading position and can selectively engage a shaft of the valve 833 when the associated vessel is in the unloading position. Immediately below the valve 833 in the unloading position is an inflatable seal 836 mounted to an adapter plate 838 which in turn is mounted within a lower plate 840 of the enclosure defining the processing chamber 800. The adapter plate may carry another ball valve 841 which, in turn, at its lower flange is secured to the upper flange of a lower transfer lock 842 similarly constructed to the upper transfer lock 810 and similarly carrying a ball valve 844. The bottom flange of the ball valve 844 is secured to an adapter 846 which in turn carries a downward-facing inflatable seal 848 which may be caused to engage an upper rim flange of a shipping container 850 (e.g., a can, drum, or the like). The adapter 846 advantageously receives tubes 852 through which dry nitrogen, argon, or other suitable gas can be flushed through the container (e.g., in one tube and out the other). Multiple such containers 850 can be carried along a conveyor 854 through the illustrated position for receiving particulate and to subsequent positions for capping (lidding) operations and the like.

Figure 21:
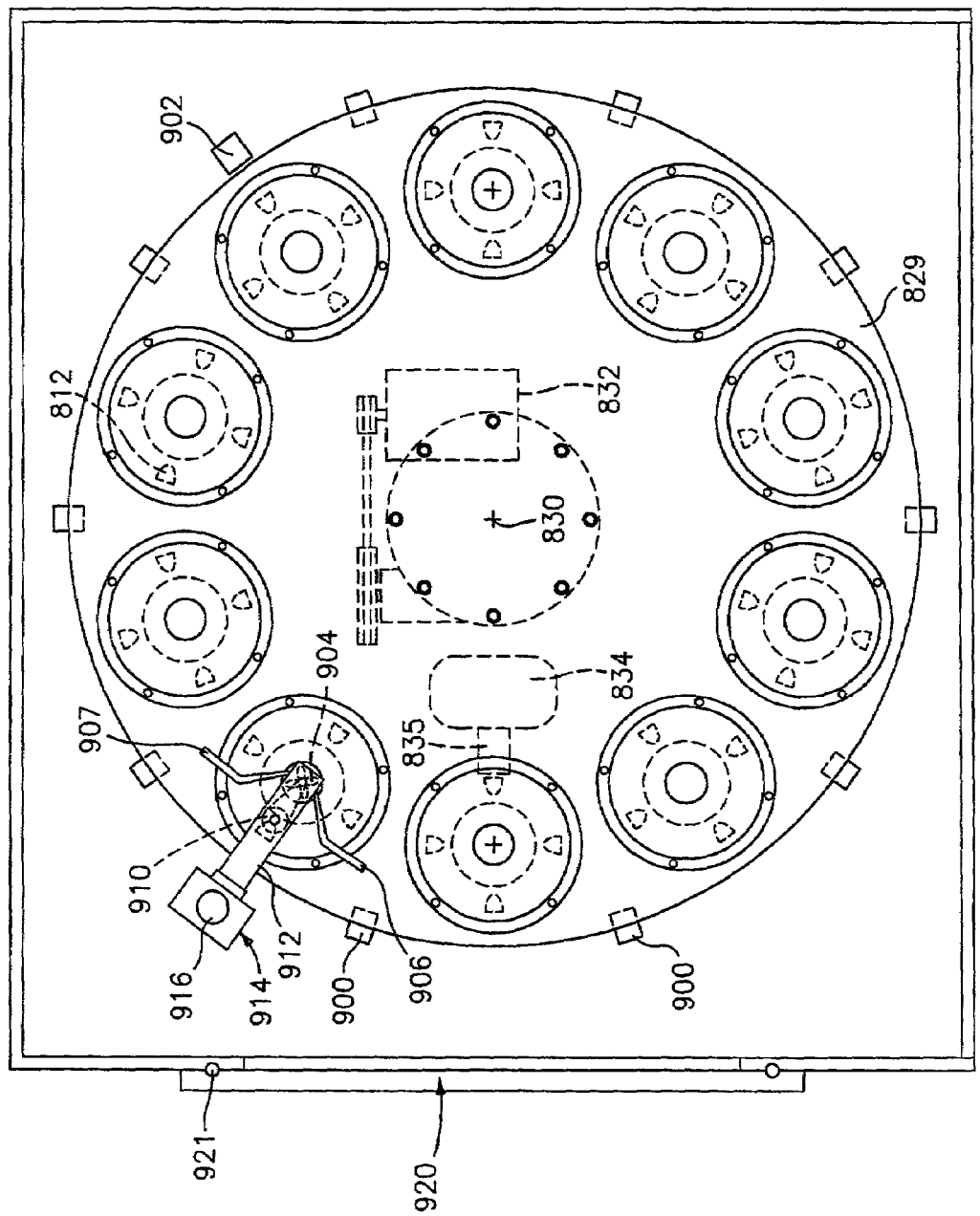
FIG. 21 is a partially schematic top view of a carousel of the processing subsystem.

Among potential additional positions for the vessels 826 are a liquid agent delivery position wherein a liquid processing agent is supplied by a liquid delivery system through the open upper end of the processing vessel and a mixing position in which a mixing element (e.g., an electrically or pneumatically driven blade) is inserted into the vessel to mix the powder and reagents. Solid reagents may be similarly delivered and multiple liquid and solid reagents may be delivered at a given position or at separate positions. There may be multiple such mixing positions. FIG. 21 shows one combined position in which a blade 904 may be introduced to the vessel for mixing and a pair of probes 906 and 907 can introduce appropriate processing agents from appropriate sources (not shown) thereof. The shaft of the exemplary blade is driven by a motor 910 via a belt and pulley transmission. The blade 904 depends from a gantry 912 on which the motor 910 is mounted. The gantry is vertically moveable along a tower 914 and may be driven up the tower by a motor 916 to permit the vessel to pass below the blade and may be driven down to guide the blade into the vessel to permit mixing (stirring). FIG. 21 further shows the processing chamber being provided with a door 920 sealed to the remainder of the chamber by an O-ring 921. A front wall of the processing chamber is advantageously formed of a transparent material (such as a panel of laminated glass) to permit observation of the chamber interior. Side, top, bottom, and rear panels may, advantageously, be formed of 0.5 inch (1.3 cm) thick aluminum or other effectively rigid material hermetically sealed to each other by means of a sealing compound.

Figure 22:
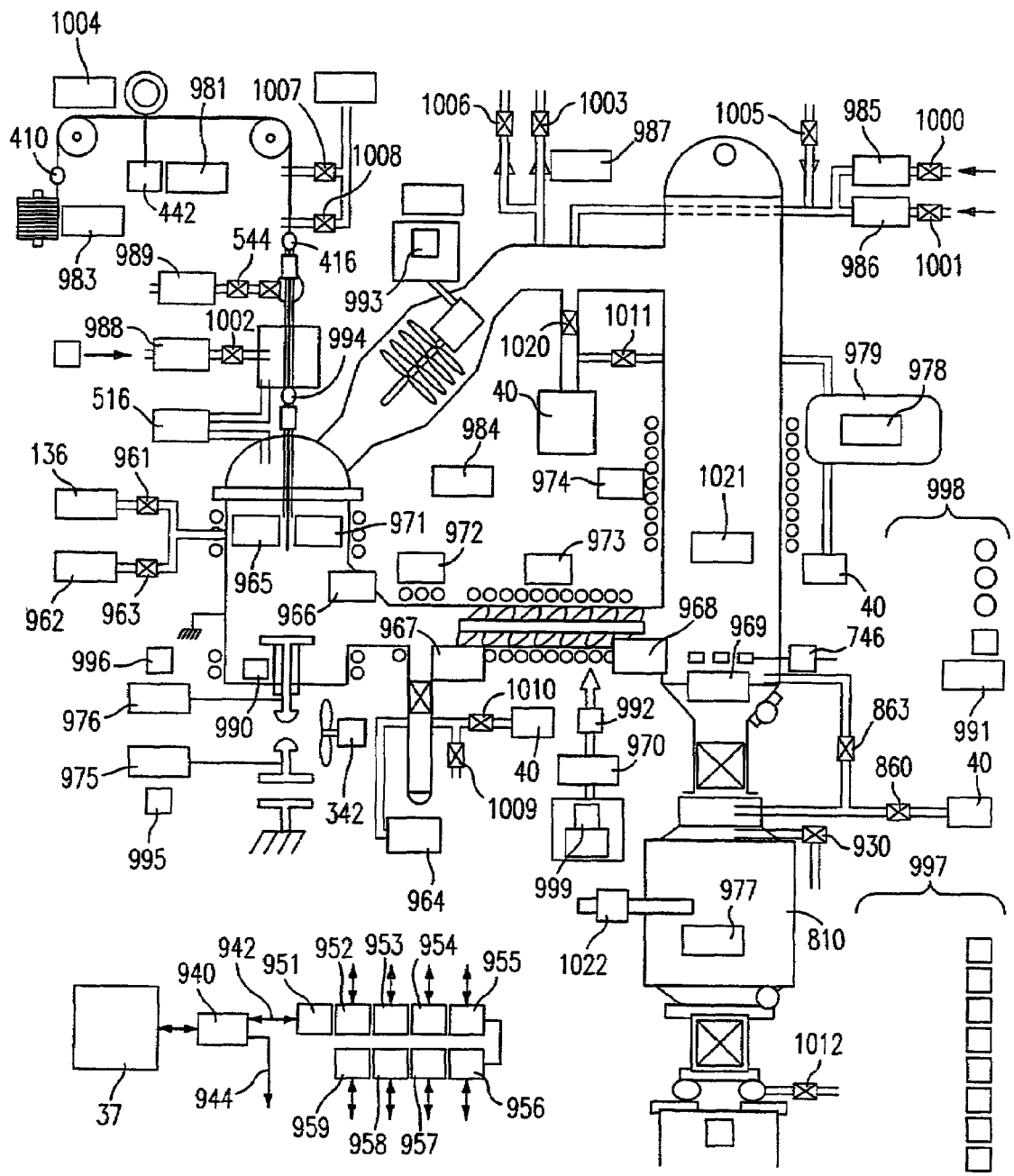
FIG. 22 is a schematic view of control/monitoring components associated with particle generating portions of the system of FIG. 1.

In operation, when powder has accumulated in the hopper 704, to a preset level detected by the sensor 746, the lock 810 is pumped to vacuum through one of the associated tubes 815 (FIG. 18) coupled to a vacuum source 40 (FIG. 22). This is done by slowly opening a toggle valve 860 in the line 815 thus connecting the lock to the vacuum source via a HEPA filter 861 and a needle valve 862. After evacuation is complete, the toggle valve 860 is closed and a second toggle valve 863 in a second line delivering reaction gas from the recirculating gas path is opened, filling the lock with the reaction gas and readying it for communication with the extractor. The valve 770 is then opened, and the hopper vibrator activated to fill the lock. The valve 770 is then closed. To ready the lock for communication with the processing environment, the lock is again similarly evacuated, whereupon the processing gas may be introduced to the lock from the processing chamber interior via another line in another of its ports with another toggle valve 930, needle valve 931, and HEPA filter 932. Via appropriate carousel rotation, an empty vessel 826 is positioned below the outlet valve 820 of the lock 810 and sealed thereto via inflation of the seal 822. The valve 820 is opened, and the lock's vibrator activated to encourage the transferred powder to fall into the vessel. Preferably, an interval of time (e.g., 30 minutes) is provided to allow any dust from the powder to completely settle so that the seal 822 may be deflated and the carousel rotated without dust escape. After seal disengagement, the carousel is rotated by an increment to expose the powder to the processing atmosphere within the processing chamber through the open upper end of the vessel. One or more intermediate positions of the vessel between its loading and unloading positions may involve processing steps (as previously discussed). In certain of the positions no active processing (e.g., mechanical mixing or addition of liquid agents) may be required. Rather, such positions may merely serve to provide further exposure of the powder to the processing atmosphere within the processing chamber. All processing steps are, advantageously, under the active monitoring and control of the subsystem 36.

Upon completion of processing of the powder contained therein, a particular vessel is at or incremented to the unloading position, whereupon, the seal 836 is inflated to seal the outlet valve 833 of the vessel to the valve 841. The lock 842 may be or have been evacuated and then filled with the processing gas by similar valve/filter combinations as was the lock 810. The valves 833 and 841 may then be opened, permitting the processed powder to fall into the lock 842. The lock's vibrator may be activated to further assist. When there has been sufficient time for any dust to settle, the valves 833 and 841 may then be closed, whereupon, the lock 842 may again be pumped to vacuum and then filled with ambient air by another valve/filter combination. At this point, with a container 850 operatively positioned beneath the lock 842, the seal 848 inflated. The outlet valve 844 of the lock 842 may then be opened and the associated vibrator activated to transfer powder to the container 850. Upon closing the valve and disengagement of the seal, the container is free to proceed downstream along the carousel. Optionally, the container may have previously been flushed with an inert gas through tubes 852 for removal of water vapor.

The control/monitoring subsystem operates all aspects of processing. A composition of the processing gas may be controlled by a multi-channel gas mixing system that allows a wide range of automatic control. A principal component of the processing gas is an inert carrier gas (e.g., argon at a flow rate of about 1 liter per minute). Additional gases may be added to the carrier. One additional gas is argon containing trace oxygen (preferably 500 ppm). A second is argon saturated with water vapor.

In an exemplary embodiment, the carrier gas is introduced via toggle shutoff valve 860 and proportional valve 861 at a rate indicated via flow meter 862. The first additional gas is introduced through toggle valve 864, proportional valve 865 and flow meter 866. The second additional gas is introduced through proportional valve 868 and flow meter 869. The required process gas composition is achieved by regulating the respective rates of these additional gases relative each other and the carrier gas, the flows being controlled by outputs of digital-to-analog converter modules on the I/O bus. This is advantageously performed via two feedback loops. The oxygen and water vapor concentrations ($PO_2$ and $pH_2O$) in the chamber are continuously monitored by sensors 870 and 871, digitized, and transmitted via the bus to the computer. The computer compares the sensed values with setpoints and transmits negative feedback error signals to proportional valves 865 and 868 which open or close depending on the sign and magnitude of the errors, thereby forcing the oxygen and water vapor concentration in the chamber to approach the setpoints. Respective setpoints are in the vicinity of 0–100 ppm $O_2$ and 0–1000 ppm $H_2O$.

The water-saturated argon is prepared by bubbling argon gas from a source thereof through a porous frit 872 immersed in water 873 within a tall vertically-extending tank 874. The water is prepurged of oxygen in a second tank 875. Argon is admitted through a second frit 876 within the water in the second tank 875 and exits the headspace of the second tank via a toggle valve 877 held open only during flush of the second tank. Water transfer to the first tank is facilitated by closing toggle valve 878 which otherwise admits argon to the tank 874 and flush toggle valve 877. A toggle valve 879 normally blocking a conduit which extends from the bottom of the second tank 875 to the headspace of the first tank 874 is then opened. Gas pressure in the headspace of the second tank 875 is then sufficient to drive the water between the tanks through the valve 879. After transfer, the valve 879 is shut and the valve 878 opened to permit normal flow of argon through the first tank 874. The water in the second tank 875 is replenished form a deionizer 882 from which the water flows through a toggle valve 883 to a reservoir 884 and therefrom through a toggle valve 886 to the second tank 875. Water level sensors within the tanks and reservoir are coupled to the bus for monitoring water levels and maintaining them within desired ranges. Preferably, the pressure within the processing gas chamber is maintained slightly above ambient atmospheric pressure. The differential pressure sensor 890 detects this pressure difference and transmits this via the bus to the computer. The computer compares this with a set point (e.g., 0.005–0.02 psig (34–138 n/m/m)) and transmits a negative feedback error signal to a valve 892 which, when opened, vents gas from the process chamber to reduce the pressure difference or, when closed, prevents venting of gas to increase the difference.

Figure 23:
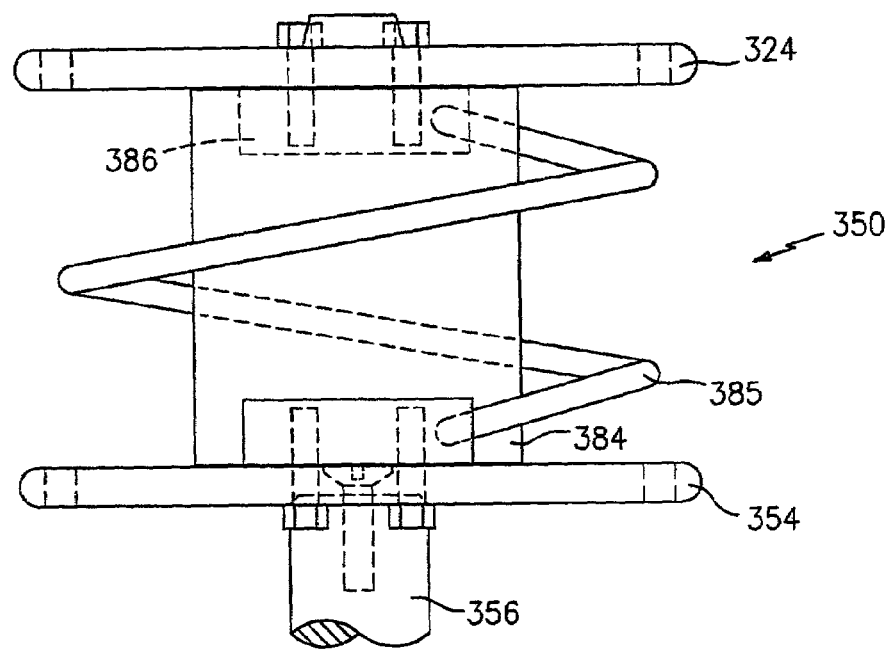
FIG. 23 is a side view of an inductor in the high voltage electrical subsystem.
Figure 24:
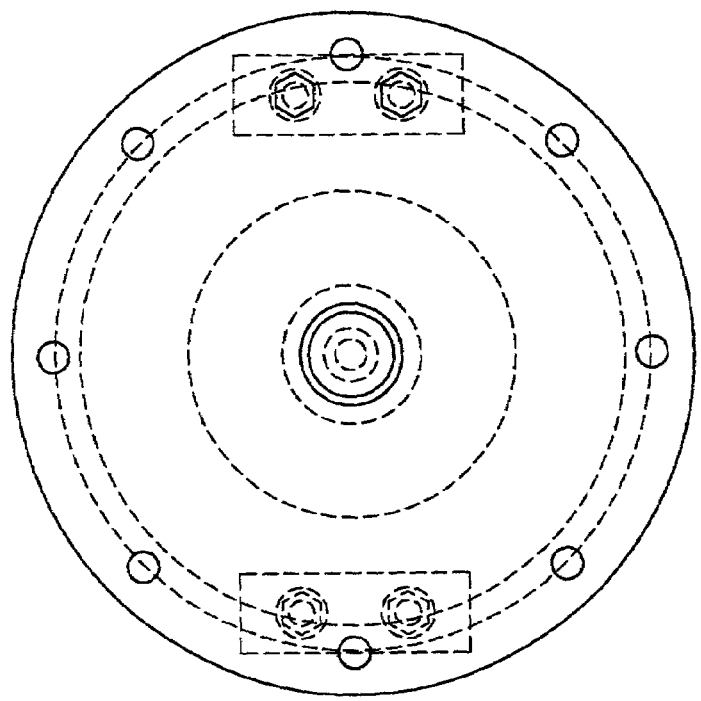
FIG. 24 is a top view of the inductor of FIG. 23.

FIGS. 23 and 24 show further details of the variable inductor 350 of FIG. 11. A central element 384 separates the disks or plates 324 and 354. To provide the inductance, a conductor 385 may encircle the central axis. An exemplary conductor is a solid copper rod of approximately 0.375 inch (0.95 cm) diameter bent into a helix and, at its upper and lower ends, soldered into conductive blocks 386 which are in turn bolted to the inboard faces of the plates 324 and 354. To optionally increase and/or adjust the inductance, the element 384 may be provided having a substantially greater magnetic permeability than does air, an example being ferrite. The element may be formed as a single ferrite slug or may be formed as a plastic block having a plurality of compartments for receiving individual small ferrite slugs. The number of such small slugs introduced to the associated compartments can be user-adjustable to provide adjustment of inductance. Alternatively, the inductance between the plates may be replaced with a minimally inductive element such as a single copper shorting block. The presence of inductance (and preferably a user-adjustable inductance) is believed advantageous to permit at least a basic adjustment of the duration and profile of discharge.

The exemplary microcomputer 37 has an 800 MHz Intel Pentium-III microprocessor running the Microsoft Windows98 operating system and executing concurrently a number of software modules ("virtual instruments") written in the "G" language of National Instruments Corporation of Austin, Tex., as implemented in their LabView application suite.

The communications interface consists of an Ethernet port on the computer, connected via a multi-port hub to two banks of National Instruments FieldPoint modules, one bank serving the EEW reactor system, the other serving the post-EEW processing system. Each bank comprises a National Instruments FP-1600 ethernet communications module and a plurality of distributed input/output (I/O) modules, each I/O module having either 8 or 16 channels ("devices") depending on module type. There are preferably 8 modules serving the EEW system (112 data channels) and 7 modules serving the post-EEW processing system (96 data channels), the total number of distributed I/O devices in the preferred control system embodiment being 208.

All devices are polled or written to preferably once per second. The entire state of the system is written to disk preferably once per minute and also immediately after any failure condition. A new log file is created preferably each day, for example at midnight.

The software provides a graphical interactive "virtual instrument" interface for the following types of control and display structures:

1. Selection of manual or servo control of the subsystems. In manual mode, analog and digital control values are written directly to digital and analog effectors such as valves, switches, power supplies etc, via FieldPoint output devices (solid state switches or digital-analog converters respectively). In servo mode, setpoints (e.g., required pressures, gas compositions, pulse energies etc) are entered either numerically or graphically and computationally compared with sensor data. The software then computes the required output variable values to zero the servo errors, and transmits them to the appropriate effectors.

2. Selection of "real" or "simulated" analog and digital sensor data. "Real" sensor data is used during actual operation of the machine. "Simulated" sensor data is used for machine set-up and diagnostics.

3. On-line calibration of every analog input and output channel.

4. Full real-time numerical or Boolean readout (as appropriate) of all sense and control channel data, analog and digital.

5. Real-time graphical display of selected machine parameters and their trends. In servo mode, the feedback errors of all critical systems are logged and displayed in real time also, to monitor control loop stability.

6. Interactive, real-time adjustment of the proportional, integral, and differential (PID) coefficients of all feedback loops, to permit on-the-fly optimization thereof.

7. Ability to save the complete state of the system to disk, for the purpose of recovering it rapidly in the event of a failure.

8. A comprehensive suite of error messages, including out-of-permitted-range values such as excessive powder temperatures and "not allowed" states that might be erroneously selected by the user but which are locked out by the software (e.g., clicking the control icons of valves that cannot safely be opened during certain parts of the system cycle). Alarms are activated in situations requiring prompt operator attention. A subset of failure states are defined in which full or selective system shutdown is executed. All valves are failsafe in the event of power loss, resulting in automatic isolation of the EEW and/or processing systems without depressurization. An uninterruptible power supply (UPS) provides electrical power sufficient for a graceful computer shutdown including a log-file write, and for automatic retraction of wire before the infeed valves shut. Power loss also latches all energetic systems "cold", requiring a manual re-start. Full safety interlocks are provided on all high voltage and pressurized systems, as an example to prevent access to a live spark gap, or to prevent removal of the stub trap unless it is first de-pressurized and isolated.

The principal devices preferably deployed in control and monitoring of the EEW section are as follows:
a) the computer 37;
b) the multi-port Ethernet hub 940 serving EEW system data bus 942 and processing subsystem data bus 944;
c) the FP-1600 communications module 951;
d) distributed I/O modules, including:
  2×FP-DO-401 digital output modules 952, 953 (valve & relay control, sourcing);
  1×FP-DO-403 digital output module 954 (valve & relay control, sinking);
  1×FP-DO-301 digital input module 955 (reads actuator, switch, and interlock status);
  1×FP-AO-200 analog output module 956 (controls proportional actuators such as gas-flow valves; programs high-voltage power supply & wire tension);
  1×FP-TC-120 analog input module 957 (reads thermocouples);
  1×FP-A-110 analog input module 958 (reads voltage-output transducers); and
  1×FP-AI-111 analog input module 959 (reads current-output transducers);
e) analog transducers, including:
  the solid-state absolute pressure gauge/transmitter 136 (preferably Druck PMP4070 or equivalent), connected to the reaction chamber such as by means of appropriate tubing (e.g., 0.25 inch (0.635 cm) stainless steel), via solenoid-operated toggle valve 961;
  a vacuum gauge/transmitter 962 (preferably Pfeiffer PTR26572 or equivalent Pirani-type gauge), connected to the reaction chamber via solenoid-operated toggle valve 963;
  the differential pressure gauge/transmitter 516 (preferably Druck PMP4170 or equivalent), connected to the reaction chamber and to the pressure-balancing chamber;
  a solid-state absolute pressure gauge/transmitter 964 connected to the stub trap;

thermocouple sensors 965–969 and 1021 (preferably a type-E thermocouple such as Omega NB1CXSS or equivalent), to monitor the sections of the reactor that reach substantially elevated temperatures during operation;

solid-state temperature sensors 970–974 (preferably Analog Devices AD590 or equivalent) to monitor the temperatures of the coolant lines;

a voltage-divider monitor circuit 975 for the EEW high voltage line;

a voltage-divider monitor circuit 976 for the trigger-pulse peak voltage;

a solid-state absolute pressure gauge/transmitter 977 connected to the high-pressure transfer lock 810;

a vacuum gauge/transmitter 978 (preferably Motorola MPX2000 or equivalent), connected to the vacuum ballast reservoir 979;

a strain gauge 981 monitoring wire tension in the wire-feed shuttle (e.g., pulley 442);

a strain gauge 983 monitoring the weight of the wire feedstock spool;

a turbine tachometer 984;

gas flow meters 985 through 989;

a current sensor 990; and a compressed air pressure transducer 991;

f) digital (Boolean) transducers, including:

a coolant flow sensor 992;

a hydraulic pressure sensor 993 coupled to the compressor power unit;

wire sensors 410, 416, 994;

a live high voltage sensor 995;

a live trigger circuit detector 996;

power systems status indicators 997;

gas supplies status indicators 998;

a powder level sensor 746; and a refrigerator thermostat 999;

g) analog effectors, including:

mass flow controllers 1000, 1001 governing flow from sources of the reaction gas components, and 1002 covering flow from a source of the balancing gas;

a proportional valve 1003; and a drive amplifier 1004 of the hysteresis brake; and h) digital (Boolean) effectors, including:

toggle valves 544, 860, 863, 930, and 1005–1012;

ball valves including 1020 and those previously noted; the vibrators; and an ultrasonicator 1022.

In a basic sequence of operation, the wire explosions occur at an explosion interval and rate. A maximum rate is desired and is determined by the maximum cycle rate of the wire feed mechanism or by the maximum charge cycle rate of the energy storage capacitors. In a preferred embodiment utilizing respective infeed lengths of 8, 10, and 14 inches (20, 25, and 36 cm) maximum rates would be associated with 0.5, 0.7, and 1.0 second cycle times. With an exemplary power supply 376 of three Spellman High Voltage Corporation (Haupauge, N.Y.) SR6 units in parallel with a combined rating of 0.3 A constant current to 60 kV, exemplary parameters and maximum cycle rates are:

at V=60 kV, C=4 microfarad (8×0.5 microfarad), 1 shot/ 0.8 sec; and at V=30 kV, C=2 microfarad (4×0.5 microfarad), 5 shots/ sec.

Accordingly, the feed mechanism will likely be the limiting factor except for full power discharges.

The wire feed and explosion are advantageously synchronized locally, i.e., not via the distributed I/O bus. The operational parameters of the wire feed are downloaded into the local controller (e.g., Oriental Motor Model SC8800E) via a serial link. The I/O bus monitors the feed sensors and causes shutdown in the event of feed system and/or high voltage power supply failure.

As the wire feedstock is consumed, the powder product cakes on the upstream (outer) surfaces of the filter elements, resulting in a slow rise in resistance to further gas flow. When the differential pressure across the filter has risen to a threshold value, the filter controller initiates a blowback. Blowback can be either of all elements simultaneously, or the blowback nozzles associated with each port 726 can be blown independently, for example sequentially. After blowback, the differential pressure returns to an initial value, corresponding to the level of permanent cake loading, and the cycle repeats. A typical blowback cycle time is once per hour. Blowback is advantageously controlled locally, i.e., not via the bus. However, each blowback event is logged into the computer over the bus.

As the blowback cycles continue, powder accumulates in the filter hopper section. When the hopper is full, the level sensor transmits a signal to the computer over the bus. The upper transfer lock is now prepared to accept a dump of a batch of powder as previously described. An exemplary dump rate is once per six hours, which may also be the rate at which processed powder containers are output from the system.

A new log file is created periodically, preferably once per day, by way of illustration at midnight. A new spool of wire must also be loaded periodically, by way of example once a day depending upon spool size, explosion rate and wire infeed length.

Prior to commencing explosion of wire, the internal atmosphere of the EEW system must be established. First, all valves are closed. Vacuum pump 40 is then switched on and ball valve 1020 opened, initiating evacuation of the EEW containment. The initial phase of the pump-down is monitored by opening valve 961 and reading the absolute pressure gauge 136. When the pressure has fallen below about 0.1 atmosphere, the Pirani gauge 962 may be switched in, by opening valve 963 (to protect gauge 962, the control system closes valve 963 for all system pressures exceeding 0.5 atm absolute).

Evacuation is allowed to proceed to approximately 0.001 torr, at which point valve 1020 is closed, and the system allowed to stand for 24 hours, during which gauge 962 is continuously monitored to ensure that no leaks are present. Assuming this is so, valve 963 is closed, and flush inlet valve 1005 is opened, admitting pure helium into the system to a positive pressure of 2–5 atmospheres as indicated by gauge 136. Valve 1005 is then closed. A helium leak detector may now be used to confirm the integrity of the containment. The helium is then vented by opening flush outlet valve 1006 until the EEW containment reaches atmospheric pressure.

The entire system is now once more evacuated as described above, charged with argon to somewhat above atmospheric pressure via valve 1005, depressurized via valve 1006, and re-evacuated.

The working reaction gas atmosphere is composed by mixing together a first gas (for example, argon) and a second gas (for example, 90% argon, 10% hydrogen) in a known volumetric ratio. This is achieved by adjusting the relative flow rates of the respective proportional gas inflow valves 1000, 1001, quantitatively controlled via mass flow meters 985, 986. The source gases are obtained from high-pressure storage tanks or liquefied-gas dewars (not shown) connected to the valves 1000, 1001.

The pressure of the working atmosphere is defined by opposing the combined inflows described above with a restricted outflow. Two such outflow paths are present. The first (not actively controlled) is through the tube 512 of the pressure-balancing system (port) 502. The second is an actively-controlled outflow restriction, preferably a proportional valve 1003 controlled by a negative feedback loop based on the difference between the EEW system setpoint provided by the computer, and the actual pressure measured by transducer 136. The difference between these quantities is inverted, amplified (amplifier not shown) and fed back to the valve 1003. Thus, if the system pressure falls below the setpoint, valve 1003 operates so as to decrease its effective aperture (increase its flow restriction). Conversely, if the system pressure increases above the setpoint, valve 1003 operates so as to increase its aperture (decreased restriction).

It is to be noted that operation of the upper transfer lock necessarily entails some loss of EEW reaction gas. This is automatically compensated for by the above feedback system.

It is further to be noted that if it is required to change the gas composition by a substantial amount, it may be advantageous to partially decompress the EEW system via valve 1006 as a preliminary step. The amount of depressurization necessary for an optimally fast large-step response may readily be calculated.

The physical dimensions of the reactor vessel are dictated and constrained by complex electrical and hydrodynamic factors, none of which can be modelled exactly. For example, both the resistive and reactive impedances vary with time during the discharge in a very complex manner. However, some guidelines may be established.

First, the reactor chamber diameter must be sufficient to ensure that the plume of metal plasma resulting from the explosion of the wire cools and condenses before its outward expansion reached the chamber wall. Otherwise particle deformation due to impact with the chamber wall and/or particles depositing on the chamber wall may occur to an excessive degree. For the discharge energies ordinarily employed in EEW, this means the reactor diameter must be at least approximately 25 cm. A significant benefit of increasing the chamber diameter still further is that by so doing the pulse overpressure (and hence the minimum chamber wall thickness required to withstand it) is diminished.

By increasing the chamber diameter, however, the electrical inductance L of the discharge path is increased. This in turn increases the electrical risetime and reduces the peak discharge current. It is essential to the EEW process that the discharge current exceed the minimum required to confine the plasma through superheat phase, typically 1–5 microseconds. This limits the allowable value of inductance. The half-period of the resonant circuit formed by the energy storage capacitance C and the electrical inductance L of its discharge path is given approximately by $\tau = \pi(LC)^{-0.5}$. To vaporize and superheat sufficient length of wire to make the EEW process economically viable (>15 cm), a storage capacitor on the order of 1 microfarad is required, charged to around 30 kV. Hence, each microhenry of circuit inductance contributes approximately $\pi(=3.14)$ microseconds to the value of $\tau$. Thus, L should not exceed 1 microhenry approximately.

The total system inductance is L=L1+L2+L3+L4 where L1 and L2 are the distributed coaxial inductances formed by the chamber and the EEW wire segment and high-voltage busbar respectively, and L3, L4 are the parasitic inductances of the spark gap and energy storage inductances. L3 and L4 are typically about 100 nH each (combined parasitic inductance ~0.2 $\mu$H).

L1 is approximately related to the diameter of the chamber (b) and the thickness (a) and length (1) of the EEW wire as follows:

$$L1 \sim (\mu_0/2\pi)(1)(\ln(b/a)) \text{ in Henrys}$$

where $\mu_0$ is the magnetic permeability of free space =$4\pi \times 10^{-7}$ weber/amp-meter, b is the chamber diameter in meters, 1 is the wire length in meters, and a is the wire diameter in meters.

A similar equation relates L2 to the chamber diameter (b) and the thickness (d) and length (c) of the high-voltage busbar:

$$L2 \sim (\mu_0/2\pi)(c)(\ln(b/d)) \text{ in Henrys}$$

where $\mu_0$ is the magnetic permeability of free space=$4\pi \times 10^{-7}$ weber/amp-meter, b is the chamber diameter in meters, c is the busbar length in meters, and d is the busbar diameter in meters.

Because the inductance is proportional to the logarithm of the ratio of the inner and outer conductor diameters, it is rather insensitive to either of these quantities.

As illustration, for a chamber of diameter b=0.4 m, containing an 1=0.25 m length of 26AWGwire (a=$0.40 \times 10^{-3}$ m) and a c=0.15 m long busbar of d=0.025 m (1.0 inch) thickness, L1+L2=(0.147+0.036) microhenry=0.183 microhenry (Example A)

Hence, L~0.38 microhenry.

Doubling the chamber diameter to b=0.8 m while keeping all other dimensions constant increases the inductance to L=0.162+0.045+0.2~0.41 $\mu$H (Example B). Unnecessarily increasing the chamber diameter is to be avoided, however, because it increases the weight (and cost) in proportion.

Changing the wire diameter has a similarly weak effect on inductance. Note also that as the wire explodes, the effective diameter of the inner conductor increases, thereby reducing the circuit inductance in a complex, time-dependent manner not readily amenable to analytical description or even to useful numerical modeling.

Increasing the wire length, however, has a strong effect. The following are given as illustration, using the same chamber dimensions and wire gauge as in Example A:

for 1=25 cm, L=0.38 microhenry (Example A);

for 1=50 cm, L=0.63 microhenry (Example C); and for 1=75 cm, L=0.78 microhenry (Example D).

Hence, inductance would likely limit the wire length to the order of 20–25 cm, using state of the art low-inductance capacitors and spark gap. For components with higher stray inductances, the maximum permissible wire length is correspondingly decreased. Because the required discharge energy is proportional to wire length 1 and to the square of wire thickness a, explosion of longer, thicker segments of wire may necessitate increasing the capacitance, which in turn raises the inductance. To accommodate explosions requiring slower rise times and decays, the inductive element 350 may be inserted in the discharge path.

The values given in Example A are a reasonable working compromise.

One or more embodiments of the present invention have been described.

Nevertheless, it will be understood that various modifications may be made without departing from the spirit and scope of the invention. For example, various systems and subsystems may be recombined and rearranged. Various off-the-shelf components may be utilized. Various components may be rescaled. A multi-loop system may be provided such as by connecting a second turbine unit, reactor, and associated ductwork and components to the otherwise capped ports 708 and 712 of a given extractor. The apparatus may potentially be utilized to make powders of pure metal, alloys, mixtures, inter-metallic compounds, oxides, nitrides, carbides, and other derivative substances that might result from a reaction of a metal vapor or plasma with a surrounding medium. The apparatus may also be utilized in the production of ultrafine powders of other substances such as semiconductors, that are capable of being vaporized by electrical discharge through a metal substrate upon which such substances have been placed or deposited. Although the exemplary wire is of nominally circular section, other forms of wire (e.g., more ribbon-like wire of nominal rectangular section) may be utilized with appropriate modification or no modification at all. Accordingly, other embodiments are within the scope of the following claims.

What is claimed is:

1. An apparatus (20) for the production of powder from a wire (31) comprising:
   a reaction chamber (100) in which an initial particulate is generated by an EEW process;
   an extractor (32) for extracting at least a portion of such particulate from a gas flowing along a gas path having: a first portion extending from the reaction chamber to tie extractor; and a second portion returning from the extractor to the reaction chamber;
   a multiple stage turbine (600) within the second portion of the flow path configured to drive the flow along the flow path;
   a wire source (400) for delivering the wire along a wire path;
   a first electrode (200) along the wire path within the reaction chamber;
   a second electrode (202) proximate a terminal end of the wire path within the reaction chamber; and
   an energy source (26) of electrical energy configured to be coupled to the first and second electrodes to selectively apply a discharge current between the first and second electrodes sufficient to explode a length of the wire to form said initial particulate.

2. The apparatus of claim 1 wherein the turbine has at least three stages and is powered by a hydraulic motor.

3. The apparatus of claim 1 wherein the wire source comprises a spool from which the wire is drawn endwise.

4. The apparatus of claim 1 wherein the spool is nonmoving during drawing of the wire.

5. The apparatus of claim 1 wherein the wire is stepwise advanceable along the wire path.

6. An apparatus (20) for the production of powder from a wire (31) comprising:
   a recirculating gas path having: a first portion extending between a reaction chamber (100) in which an initial particulate is generated by an EEW process and an extractor (32) for extracting at least a portion of such particulate from the recirculating gas; and a second portion returning from the extractor to the reaction chamber;
   a wire source (400) for delivering the wire along a wire path;
   a first electrode (200) proximate the wire path within the reaction chamber;
   a second electrode (202) proximate a terminal end of the wire path within the reaction chamber;
   an energy source (26) of electrical energy coupled to the first and second electrodes to selectively apply a discharge current between the first and second electrodes sufficient to explode a length of the wire to form said initial particulate; and
   at least one cooled surface (652, 656) along the first portion for removing heat from particles moving along the first portion.

7. The apparatus of claim 6 wherein the at least one cooled surface includes a cooled helicoid surface (656).

8. An apparatus (20) for the production of powder from a wire (31) comprising:
   a reaction chamber (100) in which an initial particulate is generated by an EEW process; an extractor (32) for extracting at least a portion of such particulate from a recirculating gas flowing along a recirculating gas path having: a first portion extending from the reaction chamber to the extractor; and a second portion returning from the extractor to the reaction chamber, the extractor configured to be effective to permit no more than 1% of the initial particulate to return to the reaction chamber along the recirculating gas path;
   a wire source (400) located external to the reaction chamber for delivering the wire along a wire path extending into the chamber, an upstream portion of the wire path configured to be isolated from the recirculating gas in the reaction chamber;
   a first electrode (200) having an aperture (258) circumscribing the wire path within the reaction chamber;
   a second electrode (202) proximate a terminal end of the wire path within the reaction chamber; and
   an energy source (26) of electrical energy configured to be coupled to the first and second electrodes to selectively apply a discharge current between the first and second electrodes sufficient to explode a length of the wire to form said initial particulate.

9. The apparatus of claim 8 wherein the extractor (32) comprises a filter element (716) having upstream and downstream surfaces, a portion of said initial particulate normally accumulating on the upstream surface until a sufficient amount of said portion has caked on said upstream surface to allow ejection of such caked particulate and cause such particulate to fall into a hopper (704).

10. The apparatus of claim 9 wherein said filter element (716) is a porous sintered stainless steel element having a submicron pore size.

11. An apparatus (20) for the production of powder from a wire (31) comprising:
   a recirculating gas path having: a first portion extending between a reaction chamber (100) in which an initial particulate is generated by an EEW process and an extractor (32) for extracting at least a portion of such particulate from the recirculating gas; and a second portion returning from the extractor to the reaction chamber;
   a wire source (400) for delivering the wire along a wire path;
   a first electrode (200) having a plurality of apertures (258), the first electrode configured to be shiftable to sequentially bring each such aperture into an operational position circumscribing the wire path within the reaction chamber,
   a second electrode (202) proximate a terminal end of the wire path within the reaction chamber; and
   an energy source (26) electrical energy configured to be coupled to the first and second electrodes to selectively apply a discharge current between the first and second electrodes sufficient to explode a length of the wire to form said initial particulate.

12. The apparatus of claim 11 wherein:
the first electrode includes at least a portion configured to be shiftable via rotation about a first axis (249) to sequentially bring each such aperture into an operational position.

13. The apparatus of claim 12 wherein the first electrode (200) comprises:
a body (231); and
a plurality of inserts (254) mounted within the body, each insert defining an associated one of the apertures.

14. The apparatus of claim 13 wherein each insert:
is formed of a tungsten copper sinter;
is mounted within the body from beneath; and
includes a central channel (258) having a relatively wide upstream portion (260) and a relatively narrow downs portion (261) defining said associated aperture.

15. The apparatus of claim 14 wherein:
the first electrode includes is configured to be moveable to permit adjustment of an operative spacing between the first electrode and the second electrode.

16. The apparatus of claim 15 wherein:
the first electrode (200) includes a spider plate (230) which is vertically movable to provide said adjustment, the body being mounted for rotation about the first axis relative to the spider plate.

17. An apparatus (20) for the production of powder from a wire (31) comprising:
a reaction chamber (100) in which an initial particulate is generated by an EEW process;
an extractor (32) for extracting at least a portion of such particulate from a recirculating gas flowing along a gas path, the gas path having: a first portion extending from the reaction chamber to the extractor; and a second portion returning from the extractor to the reaction chamber;
a wire source (400) for delivering the wire along a wire path;
a first electrode (200) along the wire path within the reaction chamber;
a second electrode (202) proximate a terminal end of the wire path within the reaction chamber; and
an energy source (26) of electrical energy configured to the first and second electrodes to selectively apply a discharge current between the first and second electrodes sufficient to explode a length of the wire to form said initial particulate, characterized in that:
the second electrode is configured to be supported by and electrically coupled to the energy source by a conductor (203) extending through the chamber wall and within the chamber substantially surrounded by an insulator (204); and
a substantially nonconductive baffle surrounds the insulator and has a slope which is directed generally downward toward an outlet effective to guide any stubs remaining after explosion out of the chamber.

18. The apparatus of claim 17 wherein a stub trap (644) is provided between the chamber and the extractor.

19. An apparatus (20) for the production of powder from a wire (31) comprising:
a reaction chamber (100) in which an initial particulate is generated by an EEW process; an extractor (32) for extracting at least a portion of such particulate from a recirculating gas flowing along a recirculating gas path having: a first portion extending from the reaction chamber to the extractor, and a second portion returning from the extractor to the reaction chamber;
a wire source (400) for delivering the wire along a wire path;
a first electrode (200) along the wire path within the reaction chamber,
a second electrode (202) proximate a terminal end of the wire path within the reaction chamber; and
an energy source (26) of electrical energy configured to be coupled to the first and second electrodes to selectively apply a discharge current between the first and second electrodes sufficient to explode a length of the wire to form said initial particulate, characterized by:
a wire straightening mechanism (402) comprising:
a first engagement member (468) configured to receive the wire from the wire source; and
a second engagement member (470) downstream of the first engagement member during operation the first and second engagement members configured to reciprocally moveable relative to each other to place an at least partially inelastic longitudinal strain on a length of the wire between the first and second engagement members of between 1% and 10% of a yield strain.

20. The apparatus of claim 19 wherein the first and second engagement members respectively comprise first and second clamps configured to be closeable to grasp the wire and openable to release the wire, in operation one such clamp (468) configured to be fixed along the wire path and the other clamp (470) configured to be moveable by an actuator between a first location in which the other clamp grasps the wire in a relatively unstrained condition and a second location in which the other clamp releases the wire at said at least partially inelastic longitudinal strain.

21. An apparatus (20) for the production of powder from a wire (31) comprising:
a recirculating gas path having: a first portion extending between a reaction chamber (100) in which an initial particulate is generated by an EEW process and an extractor (32) for extracting at least a portion of such particulate from the recirculating gas; and a second portion returning from the extractor to the reaction chamber;
a wire source (400) for delivering the wire along a wire path;
a first electrode (200) having an aperture (258) circumscribing the wire path within the reaction chamber;
a second electrode (202) proximate a terminal end of the wire path within the reaction chamber;
an energy source (26) of electrical energy configured to be coupled to the first and second electrodes to selectively apply a discharge current between the first and second electrodes sufficient to explode a length of the wire to form said initial particulate, and
a processing subsystem (33) coupled to the extractor (32) and comprising:
a processing chamber (800) for containing a processing gas;
a plurality of vessels (826) within the processing chamber each having an upper port and a lower port, the vessels configured to be moveable through a plurality of vessel positions, including:
a loading position in which the vessel receives, through its upper port, powder separated by the extractor;
at least one processing position in which the processing gas may communicate trough the upper port for contacting the powder in the vessel; and an unloading position in which the vessel discharges, through its lower port, processed powder.

22. The apparatus of claim 21 wherein the processing chamber includes a carousel (832) configured to be rotatable through a plurality of orientations to move the vessels through the plurality of vessel positions.

23. The apparatus of claim 22 wherein said vessel positions include:
a liquid agent delivery position in which the vessel receives, through its upper port, a liquid agent which coats and/or chemically reacts with the powder separated by the extractor.

24. The apparatus of claim 23 wherein said vessel positions include:
a mixing position in which a mixing element is inserted through the vessel upper port to mix the liquid agent with the powder separated by the separator.

25. The apparatus of claim 22 wherein:
a transfer vessel (810), optionally located within the processing chamber, couples the extractor to the vessel in the loading position, the transfer vessel including upper and lower ports sealed by upper (770) and lower (820) valves and including an evacuation port.

26. The apparatus of claim 22 further comprising a sampling device (814) for withdrawing a test sample of powder received from the extractor prior to processing.

27. The apparatus of claim 22 wherein the wire passes through a pressure balancing chamber (504) prior to entry into the reaction chamber.

28. An apparatus (20) for the production of powder from a wire (31) comprising:
a recirculating gas path having: a first portion extending between a reaction chamber (100) in which an initial particulate is generated by an EEW process and an extractor (32) for extracting at least a portion of such particulate from the recirculating gas; and a second portion returning from the extractor to the reaction chamber;
a wire source (400) located external to the reaction chamber and delivering the wire along a wire path extending into the chamber, an upstream portion of the wire path isolated from the recirculating gas in the reaction chamber;
a first electrode (200) having an aperture (258) circumscribing the wire path within the reaction chamber;
a second electrode (202) proximate a terminal end of the wire path within the reaction chamber; and
an energy source (26) of electrical energy configured to be coupled to the first and second electrodes to selectively apply a discharge current between the first and second electrodes sufficient to explode a length of the wire to form said initial particulate;
an isolator (502) along said wire path and providing said isolation, the isolator comprising:
a first conduit (500, 505) for receiving the wire from upstream and having an inner surface of a first minimum cross sectional area;
a second conduit (506, 512) for admitting the wire to the chamber interior downstream and having an inner surface of a second minimum cross sectional area;
a pressure balancing chamber (504) enclosing respective downstream and upstream ends of the first and second conduits and having a gas inlet port; and
a balancing gas source (514) for introducing a balancing gas through the gas inlet port and for maintaining an internal pressure of the balancing chamber slightly below an internal pressure of the reaction chamber downstream of the balancing chamber along the wire path.

29. The apparatus of claim 28 wherein the balancing gas consists essentially of argon, nitrogen, or mixtures thereof.

30. The apparatus of claim 28 further comprising a valve (508; 510) configured to have an open condition in which the wire can pass between the first and second conduits and a closed condition in which the valve blocks the wire path at the gap and seals the second conduit.

31. The apparatus of claim 28 wherein:
the wire has circular cross section with a diameter of 0.40+/−0.02 mm at the source;
the first cross sectional area is 1.5–4.1 mm$^2$; and
the second cross sectional area is 7.3–17.0 mm$^2$.

32. The apparatus of claim 28 wherein:
the wire has a cross sectional area of 0.1–0.4 mm$^2$; and
the second cross sectional area is between 130% and 500% of the first cross sectional area.

33. The apparatus of claim 28 including at least one pressure sensor (516) for determining a difference between said internal pressure of the balancing chamber and said internal pressure of the reaction chamber.

* * * * *